(12) United States Patent
Carnevali

(10) Patent No.: US 7,607,622 B2
(45) Date of Patent: Oct. 27, 2009

(54) SUCTION CUP HAVING COMPACT AXIAL INSTALLATION AND RELEASE MECHANISM

(76) Inventor: Jeffrey D. Carnevali, 5957 Beach Dr. SW., Seattle, WA (US) 98136

( * ) Notice: Subject to any disclaimer, the term of this patent is extended or adjusted under 35 U.S.C. 154(b) by 407 days.

(21) Appl. No.: 11/371,268

(22) Filed: Mar. 8, 2006

(65) Prior Publication Data

US 2007/0210225 A1 Sep. 13, 2007

(51) Int. Cl.
*F16B 47/00* (2006.01)
*A45D 42/14* (2006.01)

(52) U.S. Cl. ............. 248/205.8; 248/205.5; 248/205.6; 248/205.7; 248/205.9; 248/206.1; 248/206.2; 248/362; 248/363; 248/309.3; 248/683; 248/467; 248/537

(58) Field of Classification Search ............. 248/205.5, 248/205.6, 205.7, 205.8, 205.9, 206.1, 206.2, 248/362, 363, 309.3, 683, 467, 537
See application file for complete search history.

(56) References Cited

U.S. PATENT DOCUMENTS

| | | | |
|---|---|---|---|
| 435,752 A * | 9/1890 | Ingersoll | ........... 248/206.1 |
| 952,495 A | 3/1910 | Austin | |
| 1,871,113 A | 8/1932 | Compter et al. | |
| 2,047,658 A | 7/1936 | Zaiger | |
| 2,089,714 A | 8/1937 | Schuler | |
| 2,146,859 A | 2/1939 | Seklehner | |
| 2,542,101 A * | 2/1951 | Suben | ........... 451/388 |
| 2,657,893 A | 11/1953 | Puckert | |
| 2,898,068 A | 8/1959 | Warren | |
| 2,939,585 A | 6/1960 | Burgin | |
| 2,940,713 A | 6/1960 | Van Dusen | |
| 3,765,638 A | 10/1973 | Harrison | |
| 3,863,568 A | 2/1975 | Fredrick | |
| 4,078,128 A | 3/1978 | Hoyt et al. | |
| 4,093,165 A | 6/1978 | Susman | |
| 4,133,575 A * | 1/1979 | Mader | ........... 296/95.1 |
| 4,188,765 A | 2/1980 | Jackson | |
| 4,212,560 A | 7/1980 | Pufpaff et al. | |
| 4,262,394 A | 4/1981 | Wright | |
| 4,381,575 A | 5/1983 | Wendt | |
| 4,552,713 A | 11/1985 | Cavicchioli | |
| 4,580,794 A | 4/1986 | Gibbons | |
| 4,653,970 A | 3/1987 | Ballantyne | |
| 4,784,285 A | 11/1988 | Patel | |
| 4,852,926 A * | 8/1989 | Littell | ........... 294/64.1 |
| 4,885,121 A | 12/1989 | Patel | |
| 4,893,978 A | 1/1990 | Frano | |

(Continued)

*Primary Examiner*—J. Allen Shriver, II
*Assistant Examiner*—Nkeisha J Smith
(74) *Attorney, Agent, or Firm*—Charles J. Rupnick Attorney at Law

(57) ABSTRACT

A suction cup device having a compact axial suction cup installation and release mechanism including a suction cup within a concave housing, and a rotational drive member structured to operate on an external surface of the housing. A drive shaft is coupled to the suction cup and extends through an aperture in the housing, projecting above a drive surface axially aligned with the concave surface formed in the housing. The drive shaft extends through an aperture in the rotational drive member and includes an inclined drive surface that interacts with a fixed drive surface to pull a flexible portion of the suction cup into the housing when the rotational drive member is rotated relative to the housing.

17 Claims, 14 Drawing Sheets

U.S. PATENT DOCUMENTS

| | | | |
|---|---|---|---|
| 4,934,641 A | 6/1990 | McElhaney | |
| 5,029,786 A | 7/1991 | Wu | |
| 5,054,370 A | 10/1991 | Osterday et al. | |
| 5,059,271 A | 10/1991 | Taub | |
| 5,065,973 A | 11/1991 | Wang | |
| 5,087,005 A | 2/1992 | Holoff et al. | |
| 5,104,077 A | 4/1992 | Liu | |
| 5,187,744 A | 2/1993 | Richter | |
| 5,267,722 A | 12/1993 | Coulter | |
| 5,331,959 A | 7/1994 | Imran | |
| 5,381,990 A * | 1/1995 | Belokin et al. | 248/205.9 |
| 5,661,208 A | 8/1997 | Estes | |
| 5,992,806 A | 11/1999 | Adams | |
| 6,045,111 A * | 4/2000 | Hsieh | 248/551 |
| 6,136,039 A | 10/2000 | Kristinsson et al. | |
| 6,193,197 B1 * | 2/2001 | Lian | 248/206.2 |
| 6,478,271 B1 * | 11/2002 | Mulholland | 248/205.8 |
| 6,502,794 B1 * | 1/2003 | Ting | 248/206.2 |
| 6,552,109 B1 | 4/2003 | Chen | |
| 6,666,420 B1 * | 12/2003 | Carnevali | 248/205.8 |
| 6,881,209 B2 | 4/2005 | Boatman et al. | |
| 6,895,642 B2 | 5/2005 | Huang | |
| 6,896,228 B1 * | 5/2005 | Lu | 248/205.8 |
| 6,932,306 B2 * | 8/2005 | Zou et al. | 248/205.5 |
| 6,942,188 B2 * | 9/2005 | Tsay et al. | 248/205.8 |
| 6,966,530 B2 * | 11/2005 | Hsu | 248/206.2 |
| 7,008,452 B2 | 3/2006 | Hawkins | |
| 7,387,284 B2 * | 6/2008 | Chang | 248/206.5 |

* cited by examiner

US 7,607,622 B2

SUCTION CUP HAVING COMPACT AXIAL INSTALLATION AND RELEASE MECHANISM

FIELD OF THE INVENTION

The present invention relates to the field of suction cups, and in particular to axial suction cup installation and release devices and methods.

BACKGROUND OF THE INVENTION

Suction cups are generally well-known and commonly used to mount and secure objects to smooth surfaces such as the surfaces of glass, plastic, Formica, glazed tile, metal, and other smooth surfaces. A typical suction cup includes a cup body and a stem. The cup body is generally arcuate or circular and defines a concavity. Typically, the stem is integrally formed on the body and used as the place of attachment for the object to be supported by the suction cup. At least the body of the suction cup is made of rubber, plastic or other material having sufficiently elastically resilient properties such that, when the body is pressed against a smooth surface, the volume of concavity is reduced, thereby forcing air to be expelled so that the body forms an air-tight seal against the smooth surface. Atmospheric pressure outside the body retains the suction cup body against the surface. When the air-tight seal is broken, air rushes into the concavity, releasing the vacuum and the suction attachment to the surface. Whereupon the elastically resilient material of the suction cup body returns to its relaxed condition. The resilient suction cup can be repeatedly reused.

Suction cups are difficult to properly position. Once a suction cup is attached to a surface, the suction forces (atmospheric and friction) resist repositioning of the cup. Attachment of the suction cup to an object can also be a problem. Preferably, the attachment should be releasable.

Furthermore, the vacuum within the suction cup resists the resilient force of the body so that the force of suction balances the resilient force of the body of the suction cup. The result is a limit on the degree of vacuum which can be achieved.

One way this limitation on the vacuum can be at least partially overcome is by "pulling" the center of the suction cup body away from the surface, thereby at least partially overcoming the restraining effect of the vacuum and generating an even greater vacuum. The periphery of the suction cup forms an air-tight seal with the surface. When the center of the suction cup body is pulled resiliently away from the surface, a partial vacuum is formed between the body and the surface so that the suction cup body "sticks" to the surface. The greater the vacuum the better the cup sticks to the surface.

Several devices have been proposed to "pull" the center of the suction cup away from the surface in order to increase the suction. The most common arrangement, often found for example on the bases of pencil sharpeners and many kitchen appliances, involves a rod or crankshaft which extends mainly parallel to the surface to which the suction cup is to adhere. The center of the suction cup is attached to an eccentric section of the rod or crankshaft, and when a lever arm is turned, the center of the suction cup is pulled outward. U.S. Pat. No. 2,089,714, HOLDING DEVICE, issued Aug. 10, 1937, to Schuler; U.S. Pat. No. 3,765,638, SUCTION MOUNT, issued Oct. 16, 1973, to Harrison; and U.S. Pat. No. 4,934,641, CURVED SURFACE SUCTION MOUNTING APPARATUS, issued Jun. 19, 1990, to McElhaney, all of which are incorporated herein by reference, all describe such shaft-based arrangements.

One problem with arrangements using crankshafts and eccentric rods is the lever arms which extend out from whatever device they are mounted in. The lever arms is all too easy to hit or snagged, and the suction is thereby accidentally released. Another drawback of lever arms is that the support and bearing structure for them is difficult to integrate into the structure of the device which is utilizing the suction cups. This complication increases costs and the likelihood of failure.

A further cause of increased costs associated with such suction cup assemblies according to the prior art is that they usually require suction cups that must be specially designed to accommodate the lever arms, crankshafts, and the like.

More recently, U.S. Pat. No. 5,087,005, TWIST-CAM SUCTION CUP ASSEMBLY, issued Feb. 11, 1992, to Holoff, et al. and U.S. Pat. No. 5,381,990, RELEASABLE SUCTION CUP ASSEMBLY, issued Jan. 17, 1995, to Belokin, et al., both incorporated herein by reference, proposed devices for "pulling" the center of the suction cup axially.

Holoff, et al., for example, discloses a suction cup assembly having a suction cup, a cam member, a cone member and a mating core member secured to the suction cup. The cone member has an outer periphery generally co-extensive with an outer portion of the suction cup, and a generally cylindrical inner opening closely enclosing a cylindrical outer surface of the core member. The cam member has generally cylindrical camming surfaces, and is mounted onto and closely engages either the core member or a camming flange on the cone member, depending on the embodiment. The cam member axially shifts the core member outward relative to the cone member by pulling the center of the suction cup away from a surface to which the suction cup may be adhered.

Belokin, et al. discloses a releasable suction cup formed by a cup body which has a duct passing therethrough and a valve element for opening the duct, whereby the vacuum holding the suction cup can be released for repositioning the suction cup. The valve extends through the duct and is threaded on one end to receive a threaded fastener which is used to move the valve element into a sealing position and to secure the suction cup to an object.

The axial suction cup devices of Holoff, et al. and Belokin, et al. and others however are overly complex to manufacture, assemble and operate, as well as suffering other limitations.

Therefore, the inventor of the present invention invented the apparatus and method for a suction cup device as disclosed herein in FIGS. 1-6, and in U.S. Pat. No. 6,666,420 issued on Dec. 23, 2003, which is incorporated herein by reference, having a compact axial suction cup installation and release mechanism. The suction cup device includes a suction cup within a concave housing, and an axial drive member structured to operate on an external surface of the housing. A drive shaft is coupled to a central portion of the suction cup and extends through an aperture in the housing, projecting above a drive surface axially aligned with the concave surface formed in the housing. The drive shaft extends through a central aperture in the axial drive member and interacts with an inclined drive surface to pull the central portion of the suction cup toward and push it away from the concave surface of the housing when the axial drive member is rotated in first and second opposite directions relative to the housing.

FIG. 1 is a partial cutaway view of the invention of U.S. Pat. No. 6,666,420 embodied a suction cup device 10 having a compact axially-driven suction cup installation and release mechanism. Accordingly, the housing 12 is shown embodied by example and without limitation as having a substantially concave recess or cavity 14 formed in a first "suction" surface, a substantially planar reaction drive surface 16 formed on an opposite external surface of the housing 12 from, and axially aligned with, the concave cavity 14. An axial aperture 18 communicates between the housing drive surface 16 and the concave cavity 14. The suction cup device 10 according to the invention is intended to secure some device—a "utilization device"—to a surface. Therefore, a utilization mounting surface 20 is provided as a pattern of mounting holes raised above the operational features of the device. According to one embodiment of the invention, the utilization mounting surface 20 is formed external to the concave cavity 14 and spaced far enough from the housing drive surface 16 to fit the compact axially-driven suction cup installation and release mechanism of the invention to fit their between. The utilization mounting surface 20 is formed, by example and without limitation, with a pair of spaced apart threaded mounting holes 22.

A suction cup 24 is provided having a resiliently deformable suction portion 25 positioned within the concave cavity 14 of the housing 12 and the peripheral lip portion 28 positioned outside of the cavity 14.

A drive shaft 30 is sized to pass through the aperture 18 in the housing 12 and includes a thin disk-shaped foot portion 32 that is coupled to the deformable suction portion 25 of the suction cup 24.

A spiral rotational drive member 34 is mounted on the drive shaft 30. The rotational drive member 34 is formed having a first substantially planar drive surface 36 that, in operation, drives rotationally against the housing reaction drive surface 16. The rotational drive member 34 is further formed with an pair of upper spiral axial installation drive surfaces 38 that are axially aligned with the first planar drive surface 36 and are relatively inclined at substantially identical angles thereto, and a second pair of spiral axial release drive surfaces 39 are formed on the undersides of the installation drive surfaces 38 and have substantially the identical inclination relative to the housing reaction drive surface 16. A substantially round axial aperture 40 communicates between the planar drive surface 36 and the two inclined drive surfaces 38 and is sized to slidingly accept the axial drive shaft 30 therethrough. Installation and release drive pins 42, 43 are fixed crosswise to the drive shaft 30 and spaced away from the suction cup 24. The installation and release drive pins 42, 43 are structured to interact with the respective installation and release inclined drive surfaces 38, 39 of the axial drive member 30.

The suction cup housing 12, drive shaft 30 and rotational drive member 34 all may be manufactured easily and inexpensively as individual units of relatively rigid molded plastic. The installation and release drive pins 42, 43 are of a tough and sturdy material such as metal.

FIG. 2 illustrates the suction cup housing 12 of U.S. Pat. No. 6,666,420 embodied as a shallow "bell" shaped body 44 an under surface of which is formed with the concave cavity 14. As is more clearly shown in FIG. 1, the concave cavity 14 is by example and without limitation formed with a shallow semi-spherical shape that is further truncated at its inner surface by the substantially planar underside 46 of the drive surface 16. The concavity 14 is alternatively embodied as a shallow semi-spherical shape that maintains its curvature across the underside 46 of the drive surface 16. According to another alternative embodiment, the concavity 14 is embodied as a shallow "funnel" shape that either maintains its shape to the underside 46 of the reaction drive surface 16, or is truncated at its inner surface by the substantially planar underside 46 of the reaction drive surface 16.

The drive surface 16 is embodied as a substantially planar surface that truncates the semi-spherical exterior of the housing 12 at a position opposite from the concave cavity surface 14 and spaced apart from it by the thickness of the housing body 44. The drive surface 16 is further axially aligned with the concavity 14. The aperture 18 communicating between the reaction drive surface 16 and its underside 46 within the concavity 14 is structured to limit relative rotation of the drive shaft 30. For example, the aperture 18 is formed as a generally square or rectangular slot, although other anti-rotational shapes may be used such as oblongs, stars, kidneys and free forms. According to one embodiment, the shape of the aperture 18 follows the generally round overall theme of the axially-driven suction cup device 10 of the invention having the short sides of the rectangular slot curved or arched substantially concentric with the bell-shaped housing body 44 and the concavity 14 formed therein.

A peripheral lip portion 48 formed concentrically with the bell-shaped housing body 44 is constructed to hold the peripheral lip portion 28 of the suction cup 24 smooth, flat annular ring concentric with the housing body 44 and positioned external to the concavity 14. As is more clearly shown in FIG. 1, the lip portion 48 includes an annular groove 50 between concentric outward and downward projecting portions 52, 54 for capturing a thick and portion of the suction cup lip 28. The downward projecting portion 54 of the housing lip 48 keeps the suction cup lip 28 from being drawn into the concavity 14 during installation of the suction cup device 10, while the outwardly projecting portion 52 helps to keep the suction cup lip 28 from curling.

The suction cup housing 12 includes the utilization mounting surface 20 formed, for example, as a pair of spaced apart columns 56 diametrically opposed from one another on either side of the drive surface 16 and projecting upwardly from the external surface of the bell-shaped housing body 44. The columns 56 are sized and shaped to provide sufficient stiffness against side loading expected of the application for which suction cup device 10 is intended. The utilization mounting surfaces 20 are substantially co-planar surfaces formed substantially parallel with the drive surface 16 and disposed on the ends of the columns 56 distal from the housing body 44. Each of the utilization mounting surfaces 20 includes means 22 for attaching thereto. For example, the attaching means 22 are embodied as threaded holes or through holes backed up with embedded or free-floating metal hex nuts or another threaded insert.

FIG. 3 illustrates the suction cup 24 and the drive shaft 30 of U.S. Pat. No. 6,666,420 embodied in a plunger assembly 60. As is more clearly shown in FIG. 1, the drive shaft 30 includes an integral disk-shaped foot portion 32 expanding outwardly from one end of the column-shaped body of the drive shaft 30. The circular foot portion 32 is provided with means 62, 64 for adhering the moldable suction cup material thereto. For example, the adhering means 62, 64 (shown in cutaway) are embodied as a pattern of depressions or holes and short columnar projections, respectively, that may be present individually or in combination (shown). The columnar drive shaft 30 is sized to pass through the aperture 18 in the suction cup housing 12 and is shaped to cooperate with the aperture 18 for maintaining a constant relative rotational orientation, and thus remains rotationally oriented to the suction cup housing 12 during operation. In the example shown, the columnar drive shaft 30 generally rectangular in cross-section and is sized to slidingly engage the aperture 18. The columnar drive shaft 30 also includes one or a pair of spaced-apart crosswise through holes 66, 68 at intervals along its length, the hole 66 more proximate to the distal end of the drive shaft 30 is provided for the installation drive pin 42, while the more distal through hole 68 is provided for the release drive pin 43, as discussed below.

The suction cup 24 is a rubber, plastic or another elastically resilient material molded over the circular foot portion 32 of the drive shaft 30, as is more clearly shown in FIG. 1. The adhering means 62, 64 is to improve and ensure adhesion of the molded suction cup material to the drive shaft foot portion 32. The deformable suction portion 25 of the suction cup 24 includes a relatively stiff round center section 26 formed of the elastically resilient material over molding the foot 32 of the drive shaft 30. The relatively stiff round center section 26 is surrounded by an integral thin deformably resilient annular portion of that extends to the integral peripheral lip portion 28. According to one embodiment of the invention, the peripheral lip portion 28 is an annular ring of the elastically resilient material structured to cooperate with the annular groove 50 of the housing body's lip 48 for keeping the peripheral lip 28 from being drawn into the concavity 14 during installation of the suction cup device 10. Accordingly, the lip portion 28 includes a thickened inner peripheral annular ring 70 that forms an annular "shelf" 72 structured to fit within the annular groove 50 between outwardly and downwardly projections 52, 54. The integral peripheral lip 28 may extend outwardly in a thickened annular ring portion 74 having a cross-section of sufficient thickness to avoid curling during installation of the suction cup device 10, thereby effectively increasing the suction cup footprint and the holding power of the suction cup device.

A tab 75 extends from the periphery of the annular ring portion 74 of the suction cup 24. When the suction cup is attached to a surface, manual lifting of the tab 75 by the operator eases release of the suction cup device 10.

Although less effective in operation than a rigid material, the drive shaft 30 is optionally molded of the plastic or other elastically resilient material from which the suction cup 24 is molded. Additionally, when molded of the same material as the suction cup 24, the drive shaft 30 is optionally molded integrally with the suction cup 24, and the foot portion 32 is eliminated.

FIG. 4 illustrates one embodiment of the spiral axial drive member 34 of U.S. Pat. No. 6,666,420 that is mounted on the drive shaft 30 in FIG. 1. As embodied in FIG. 4, the axial drive member 34 includes the substantially planer drive surface 36 embodied as an annular ring formed as one surface of a substantially tubular-walled body or frame 76 that is its main structural component. In the top-down perspective view of FIG. 1 the pair of upper spiral axial installation drive surfaces 38 are shown as a pair of diametrically-opposed annular inclined surfaces around the round axial aperture 40. The installation drive surfaces 38 are offset above respective spiral axial release drive surfaces 39 and cover a vertical distance relative to the tubular walls of the frame 76 that is configured to create a substantial vacuum between the deformable suction portion 25 of the suction cup 24 and a surface to which it is attached. The lower release drive surfaces 39 begin at a minimum position relative to the frame walls 76 that is offset above the planar drive surface 36 sufficiently to permit the release drive pin 43 to pass thereunder, as is more clearly shown in FIG. 1.

The spiral installation drive surfaces 38 are provided with anti-rotation "keeper" means 78. For example, the spiral installation drive surfaces 38 extend at their maximum elevation relative to the planar drive surface 36 in an extension or "shelf" portion 80 that is formed either substantially parallel with the planar drive surface 36 or canted at a slightly negative inclination relative to the respective installation drive surfaces 38. A "saddle" is optionally created by a shallow curve or "dish" shaped in shelf to operate as the anti-rotation locking mechanism. Irrespective of configuration, the installation drive and 42 rests on the shelf portion 80. A detent 82 is optionally formed between each installation drive surface 38 and the respective extension 80 as an offset or a steeply negatively inclined plane (shown).

The pairs of spiral installation and release drive surfaces 38, 39 end in a pair of stanchions 84 diametrically opposed across the axial aperture 40. Besides supporting the upper and lower ends of the installation and release surfaces, the stanchions 84 provide stops in the form of solid surfaces 86 for one or both of the installation and release drive pins 42, 43.

The rotational drive member 34 includes access means 88 for installing the installation drive pin 42 during assembly of the suction cup device 10 and its installation and release mechanism. For example, the access means 88 is embodied as a slot through the tubular wall of the frame 76 sized to pass the installation drive pin 42. The access slot 88 is positioned along the inclined installation drive surface 38 and a point adjacent to or actually in alignment with the extension 80 at the top of one of the installation drive surfaces 38 distal from the planar drive surface 36.

Additionally, the rotational drive member 34 includes operating means 90 for gripping and manually rotating it about its longitudinal axis, as indicated by the arrow, relative to the suction cup housing 12, whereby the inclined installation and drive surfaces 38, 39 are rotated relative to the respective rotationally fixed installation and release drive pins 42, 43 and the drive shaft 30 is driven axially relative to the rotational drive member 34. The operating means 90 is embodied for example as a pair of diametrically opposed flanges projecting outwardly from the tubular walls of the frame 76, as illustrated in FIG. 4. Alternatively, the operating means 90 is embodied as another conventional manual gripping device or surface such as a knurled or grooved surface.

FIG. 5 illustrates the suction cup device 10 of U.S. Pat. No. 6,666,420 with the utilization of mounting surface 20 exposed. The illustration of FIG. 5 is useful in describing the assembly and operation of the suction cup device 10, including its compact axial suction cup installation and release mechanism. As illustrated, the suction cup 24 is installed with the deformable suction portion 25 positioned within the concavity 14 of the housing 12, as more clearly shown in FIG. 1, and the peripheral lip portion 28 extending beyond the portion 48. As is also more clearly shown in FIG. 1, the columnar drive shaft 30 passes through the cooperating axial aperture 18 communicating between the interior surface 46 of the cavity 14 and the planar drive surface 16 of the suction cup housing 12.

If present, the release drive pin 43 is inserted into and partially through the more distal hole 68 through the drive shaft 30.

The round axial aperture 40 of the rotational drive member 34 is fitted over the end of the columnar drive shaft 30 projecting through the axial aperture 18 above the housing drive surface 16. The release drive pin 43 fitting between the tubular walls of the axial drive member frame 76. The respective pairs of inclined installation and release drive surfaces 38, 39 are thereby positioned on opposite sides of the drive shaft 30 with each of the release drive surfaces 39 in proximity to the portion of the release drive in projecting crosswise from opposite sides of the drive shaft 30. The planar drive surface 36 is positioned adjacent to and in contact with the housing reaction drive surface 16, as is more clearly shown in FIG. 1. The access means, slot 88, is aligned with the second crosswise hole 66 through the distal end of the drive shaft 30.

When the suction cup 24 is in a relaxed state, the positioning of the access slot at or near the top of the inclined installation drive surface 38 causes the second crosswise hole 66 in the drive shaft 30 to be slightly below the installation drive surfaces 38 of the axial drive member 34. It is therefore partially obscured and inaccessible. A slight pressure is applied to the center section 26 of the suction cup 24, and thereby to the foot portion 32 of drive shaft 30. The drive shaft 30 is thereby moved axially relative to the housing 12 and the axially-driven rotational drive member 34 so that the second crosswise hole 66 appears above the installation drive surfaces 38. The installation drive pin 42 is now passed through the slot 88 and is inserted into and partially through the hole 66 through the drive shaft 30. During assembly, the installation drive pin 42 passes completely through the access slot 88 and thereafter fits between the tubular walls of the axial drive member frame 76. Upon release of the pressure against the suction cup center section 26, the resilient suction cup 24 attempts to return to its relaxed state. The drive shaft 30 is thereby pulled back through the axial aperture 40 in the rotational drive member 34 and the axial slot 18 in the housing 12, which generates a slight pressure between the installation drive pin 42 and the installation drive surfaces 38. This pressure acts to keep the installation drive pin 42 from backing out of the hole 66 and through the access slot 88. However, as the rotational drive member 34 is rotated to a release position, as discussed below, the installation drive pin 42 moves along the installation drive surfaces 38 downward relative to the rotational drive member 34, which releases the pressure and permits the suction cup 24 to return to its relaxed state.

In operation, with the rotational drive member 34 rotated to release pressure between the installation drive pin 42 and the inclined installation drive surface 38, the peripheral lip portion 28 of the relaxed suction cup 24 is placed against a smooth surface to which is to be attached. When the operator is satisfied with the position of the suction cup device 10 relative to the attachment surface, the torque load is applied via the flanges 90 to rotate the drive member frame 76 relative to the suction cup housing 12 in the installation direction indicated by the arrow marked "ON." During rotation, the installation drive pin 42 comes into contact with the upwardly ramping axial installation drive surfaces 38. Continued application of the torque load to the drive member frame 76 causes the installation drive pin 42 to travel upwardly along the axial installation drive surfaces 38. The planar drive surface 36 forming the bottom surface of the axial drive member 34 is simultaneously rotated against the housing reaction drive surface 16. As the installation drive pin 42 travels upwardly along the installation drive surfaces 38, it is moved axially away from the housing reaction drive surface 16. The drive shaft 30 is simultaneously drawn upwardly through axial aperture 18 in the housing drive surface 16. The foot portion 32 is carried upwardly as part of the drive shaft 30. The center section 26 of the suction cup 24 to his drawn upwardly with the foot portion 32 into the concavity 14 while the peripheral housing lip 48 maintains a manual or shape and position of the suction cup peripheral lip 28 external to the concavity 14. In effect, motion of the installation drive pin 42 upwardly along the installation drive surfaces 38 pulls the drive shaft 30 of the plunger 60 and out of the concavity 14 through the axial aperture 18 in the housing reaction drive surface 16. As the length of the plunger drive shaft 30 increases above the housing drive surface 16, the portion within the concavity 14 shortens. The thin deformably resilient annular portion 27 of the suction cup 24 is forced to stretch between the withdrawing center section 26 and the positionally fixed peripheral lip 28. An airtight cavity 92 (shown in FIG. 1) is formed beneath the suction cup wherein a partial vacuum is formed relative to ambient atmospheric pressure.

Rotation of the axially-driven drive member 34 ceases when the installation drive pin 42 encounters the solid surface 86 of one or both of the stanchions 84. Other rotational stops may also be provided such as the flanges 90 encountering one of the columns 56 bearing the utilization mounting surfaces 20.

The pressure exerted by the installation drive pin 42 is maintained by its spaced apart position relative to the housing reaction drive surface 16. This relative position is maintained by the anti-rotation keeper means 78, whereby the installation drive pin 42 is settled on the extension or step portion 80 at maximum elevation relative to the housing drive surface 16. Passing the installation drive pin 42 over the optional detent 82, as well as the tension generated in the suction cup 24, ensures that the installation drive pin 42 cannot back down the installation drive surfaces 38.

The suction cup device 10 is released from the attachment surface by release of the relative vacuum within the suction cup 24. This is accomplished by collapsing the airtight cavity 92 by driving the center 26 of the suction cup 24 downwardly to the attachment surface, whereby tension in the stretched deformably resilient annular portion 27 is released and the suction cup 24 returns to its relaxed condition. The center 26 of the suction cup 24 is driven downwardly by interaction of the release drive pin 43 with the release drive surfaces 39 when the torque load is applied to rotate the drive member 34 in a release direction, as indicated by the arrow marked "OFF." For example, a released torque load is applied to the flanges 90 of the drive member frame 76. Force by the release drive pin 43 moving downwardly along the release drive surfaces 39 combines with the elasticity of the stretched deformably resilient annular portion 27 material to push the plunger drive shaft 30 down through the axial aperture 18 into the concavity 14. When the upward force on the plunger drive shaft 30 is completely removed and the suction cup 24 is relaxed, the relative vacuum holding the suction cup device 10 against the attachment surface is released and the device 10 can be moved.

FIG. 6 illustrates the suction cup device 10 of the invention of U.S. Pat. No. 6,666,420 having a device mounting structure 94 installed on the utilization mounting surfaces 20. The device mounting structure 94 includes means for attaching to the utilization mounting surfaces 20. For example, counterbores and through holes 96 are provided a for a fastener 98 to be threaded to the nut or insert provided at the mounting holes 22. The device mounting structure 94 includes, by example and without limitation, device mounting means such as a threaded or other capture hole 100.

The two-hole diamond shape of the device mounting structure 94 illustrated is not intended to be exhaustive and is shown as only one example and without limitation. The device mounting structure 94 is optionally embodied in any useful configuration. For example, the device mounting structure 94 is embodied suitably for mounting the resiliently compressible ball-shaped coupler described in U.S. Pat. No. 5,845,885, entitled UNIVERSALLY POSITIONABLE MOUNTING DEVICE, issued Dec. 8, 1998, to the inventor of the present invention, which is incorporated herein by reference. Alternatively, the device mounting structure 94 is embodied suitably for mounting the wheel-and-axle assembly of the positively-positionable mount described in allowed U.S. patent application Ser. No. 09/855,162, entitled POSITIVELY-POSITIONABLE MOUNITNG APPARATUS, filed May 14, 2001, in the name of the inventor of the present invention, which is incorporated herein by reference.

According to another alternative, the device mounting structure 94 is embodied suitably for mounting either of the male and female mounting bases for use in combination with the flexible snap-link apparatus disclosed in U.S. patent application Ser. No. 09/654,245, entitled FLEXIBLE ELECTRONIC MOUNT APPARATUS, filed Sep. 2, 2000, in the name of the inventor of the present invention, which is incorporated herein by reference. Other alternative embodiments of the device mounting structure 94 are also contemplated for mounting a variety of different useful devices.

SUMMARY OF THE INVENTION

The present invention is an apparatus and method for a suction cup device having a compact axial suction cup installation and release mechanism. According to one aspect of the present invention, the suction cup device includes a suction cup within a concave housing, and a rotational drive member structured to operate on an external surface of the housing. A drive shaft is coupled to a central portion of the suction cup and extends through an aperture in the housing, projecting above a drive surface axially aligned with the concave surface formed in the housing. The drive shaft extends through a central aperture in the rotational drive member and includes an inclined drive surface that interacts with a cooperating rotational drive surface to pull the central portion of the suction cup toward the concave surface of the housing when the rotational drive member is rotated in a first direction relative to the housing, and optionally push the suction cup away from the concave surface of the housing when the rotational drive member is rotated in a second opposite directions relative to the housing.

According to another aspect of the invention, the housing includes a utilization mounting surface structured as a pattern of mounting holes spaced away from the housing planar drive surface a distance sufficient to admit the rotational drive mechanism therebetween.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF PREFERRED EMBODIMENT

In the Figures, like numerals indicate like elements.

The terms "up" and "down" and derivatives are used solely for clarity in describing the invention and relate to the relative orientation of the individual components shown in the Figures and the assembly relative to a surface to which it is attached.

The present invention is an apparatus and method for a suction cup device having a compact axial suction cup installation and release mechanism. The suction cup device includes a suction cup within a concave housing, and a rotational drive member structured to operate on an external surface of the housing. A drive shaft is coupled to a central portion of the suction cup and extends through an aperture in the housing, projecting above a drive surface axially aligned with the concave surface formed in the housing. The drive shaft extends through a central aperture in the rotational drive member and includes an inclined drive surface that interacts with a cooperating rotational drive surface to pull the central portion of the suction cup toward the concave surface of the housing when the rotational drive member is rotated in a first direction relative to the housing, and optionally push the suction cup away from the concave surface of the housing when the rotational drive member is rotated in a second opposite directions relative to the housing.

Figure 7:
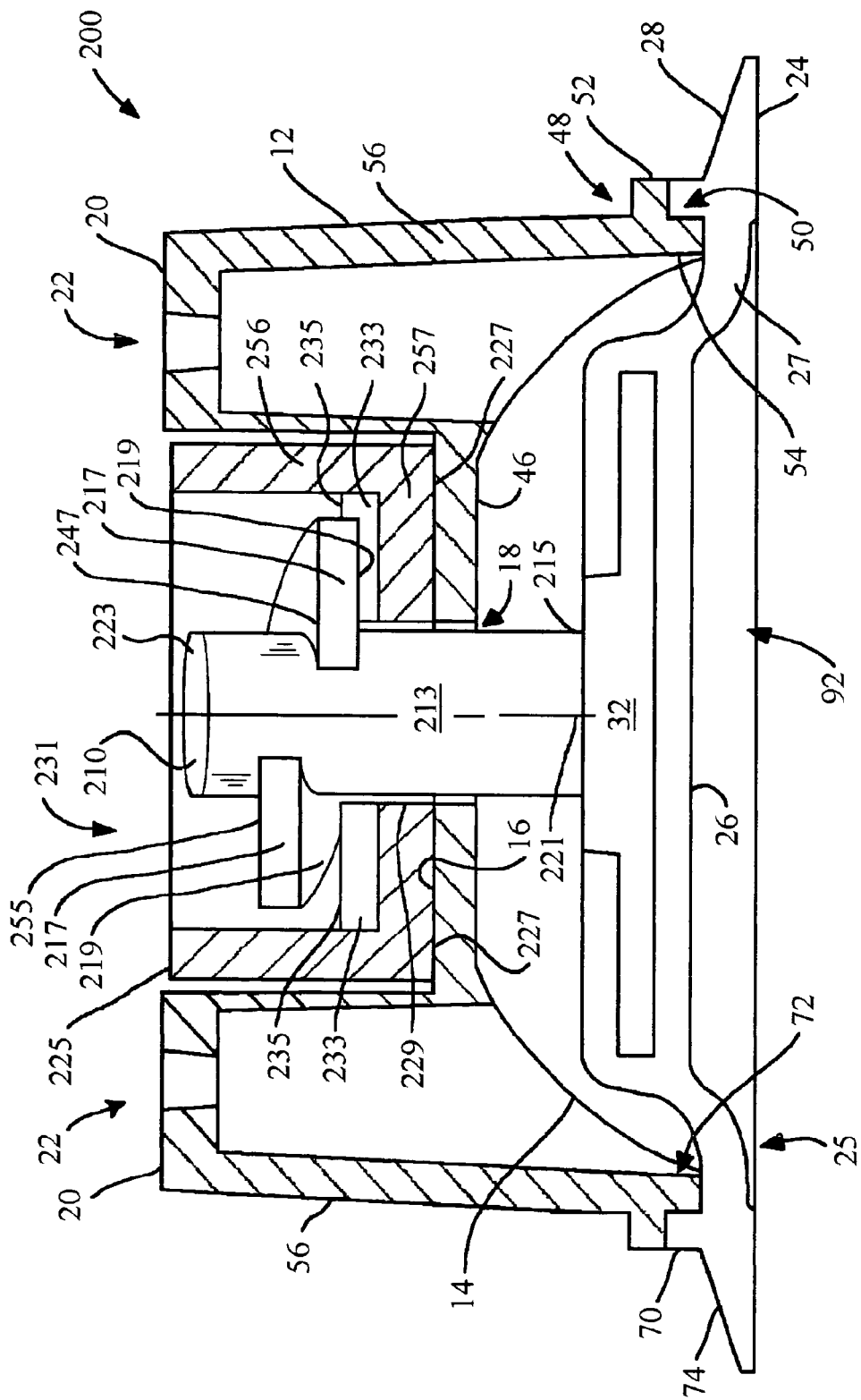
FIG. 7 is a partial cutaway view of the present invention embodied a suction cup device having a novel compact axially-driven suction cup installation and release mechanism.

FIG. 7 is a partial cutaway view of the present invention embodied a suction cup device 200 having a novel compact axially-driven suction cup installation and release mechanism. Accordingly, the housing 12 is shown embodied by example and without limitation as having the substantially concave recess or cavity 14 formed in the first "suction" surface, the substantially planar reaction drive surface 16 formed on an opposite external surface of the housing 12 from, and axially aligned with, the concave cavity 14. The axial aperture 18 communicates between the housing drive surface 16 and the concave cavity 14. The suction cup device 200 according to the invention is intended to secure some device—a "utilization device"—to a surface. Therefore, the utilization mounting surface 20 is provided as a pattern of mounting holes raised above the operational features of the device. According to one embodiment of the invention 200, the utilization mounting surface 20 is formed external to the concave cavity 14 and spaced far enough from the housing drive surface 16 to fit the compact axially-driven suction cup installation and release mechanism of the invention to fit their between. The utilization mounting surface 20 is formed, by example and without limitation, with a pair of spaced apart threaded mounting holes 22.

A suction cup 24 is provided having a resiliently deformable suction portion 25 positioned within the concave cavity 14 of the housing 12 and the peripheral lip portion 28 positioned outside of the cavity 14.

The suction cup device 200 according to the present invention includes an axial drive member 210 having a plunger drive shaft 213 that is sized to slidingly pass through the aperture 18 in the housing 12 and includes the thin disk-shaped foot portion 32 that is adjacent to a first proximate end 215 and is coupled to the center section 26 of the deformable suction cup 24. The axial drive member 210 includes one, two or more spiral installation drive members 217 each radially extended at least partially about the plunger drive shaft 213. The spiral installation drive members 217 have respective first inclined axial installation drive surfaces 219 that are relatively inclined at substantially identical angles to a longitudinal axis 221 of the plunger drive shaft 213. The spiral installation drive members 217 are positioned adjacent to a second distal end 223 of the plunger drive shaft 213 distal from the suction cup 24 and spaced away from the housing drive surface 16.

The suction cup device 200 according to the present invention includes a rotational drive member 225 mounted on the plunger drive shaft 213 and seated on the housing drive surface 16. The rotational drive member 225 is formed having a first substantially planar drive surface 227 that is structured to cooperate with the housing drive surface 16 and that, in operation, drives rotationally against the housing reaction drive surface 16. A substantially round axial aperture 229 communicates between the planar drive surface 227 and an interior cavity portion 231 of the rotational drive member 225. The axial aperture 229 is sized to slidingly engage the plunger drive shaft 213 of the axial drive member 210. The rotational drive member 225 includes one, two or more radial installation drive arms 233 each fixed crosswise to the plunger drive shaft 213 and is structured to interact with a corresponding one of the spiral installation drive surfaces 219 of the axial drive member 210.

In operation, an installation drive surface 235 on each of the radial installation drive arms 233 of the rotational drive member 225 cooperates with a corresponding one of the first spiral axial installation drive surfaces 219 to push the plunger drive shaft 213 axially along the longitudinal axis 221 away from the housing reaction drive surface 16. As a result, the center section 26 is pulled away from the smooth mounting surface, and the thin deformably resilient annular portion 27 of the suction cup 24 is stretched, whereby a partial vacuum is formed in the airtight cavity 92 between the deformable suction portion 25 and the mounting surface to hold the suction cup device 200 securely in place.

The suction cup housing 12, axial drive member 210 and rotational drive member 225 all may be manufactured easily and inexpensively as individual units of relatively rigid molded plastic.

Figure 1:
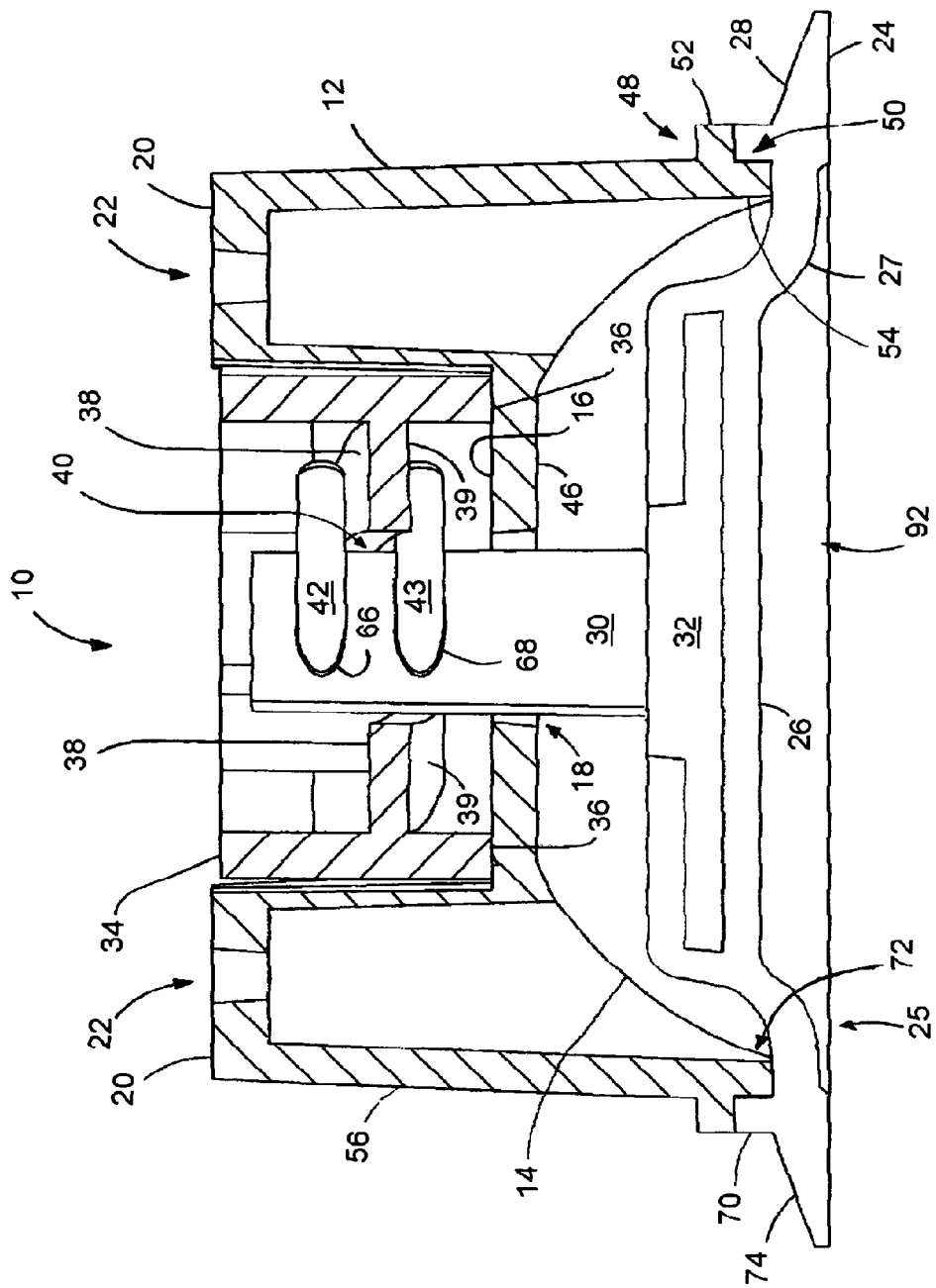
FIG. 1 is a partial cutaway view of the invention of U.S. Pat. No. 6,666,420 embodied a suction cup device having a compact axially-driven suction cup installation and release mechanism.
Figure 2:
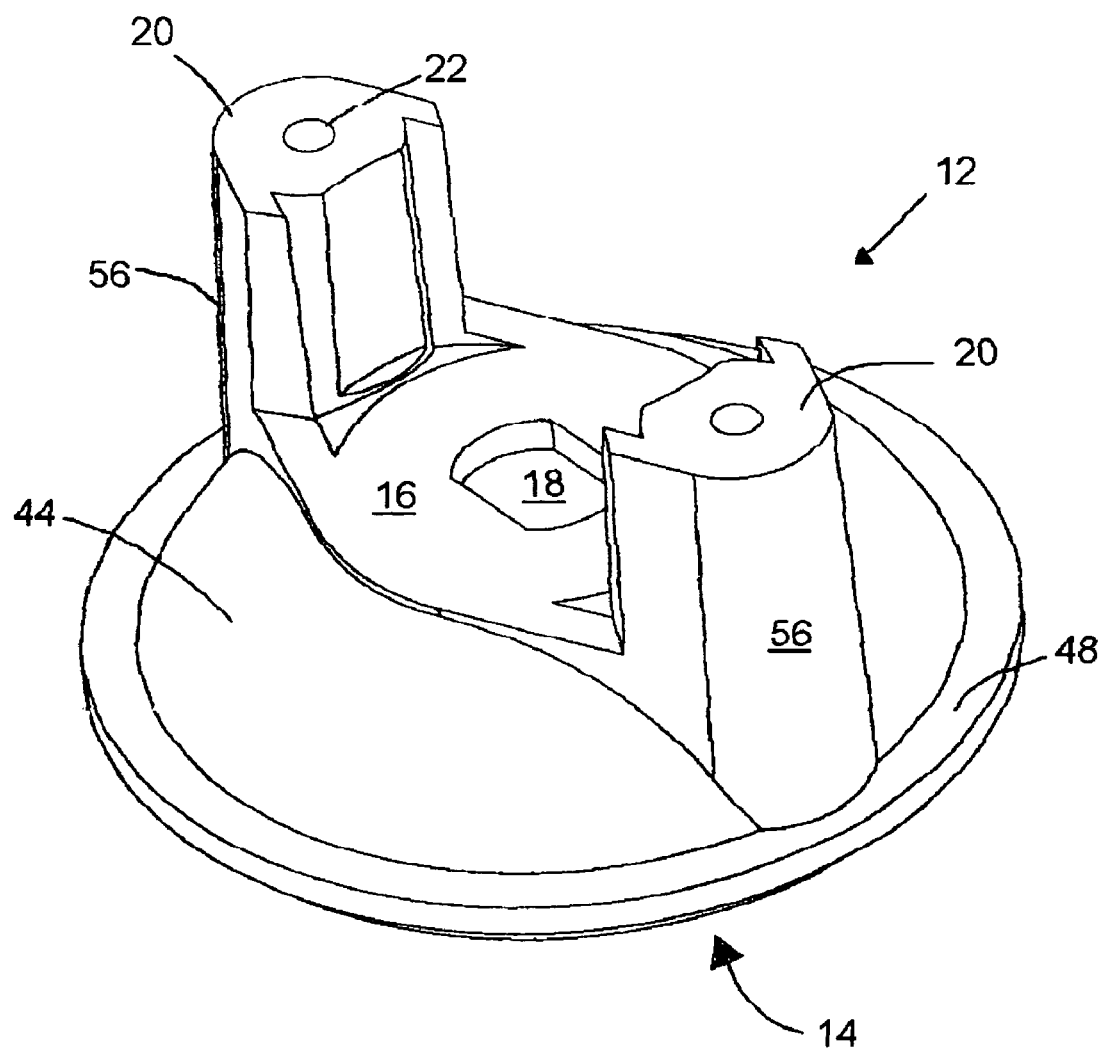
FIG. 2 illustrates the suction cup housing of the invention of U.S. Pat. No. 6,666,420 embodied as a shallow "bell" shaped body an under surface of which is formed with a concave cavity structured to cooperate with the suction cup of the invention.
Figure 3:
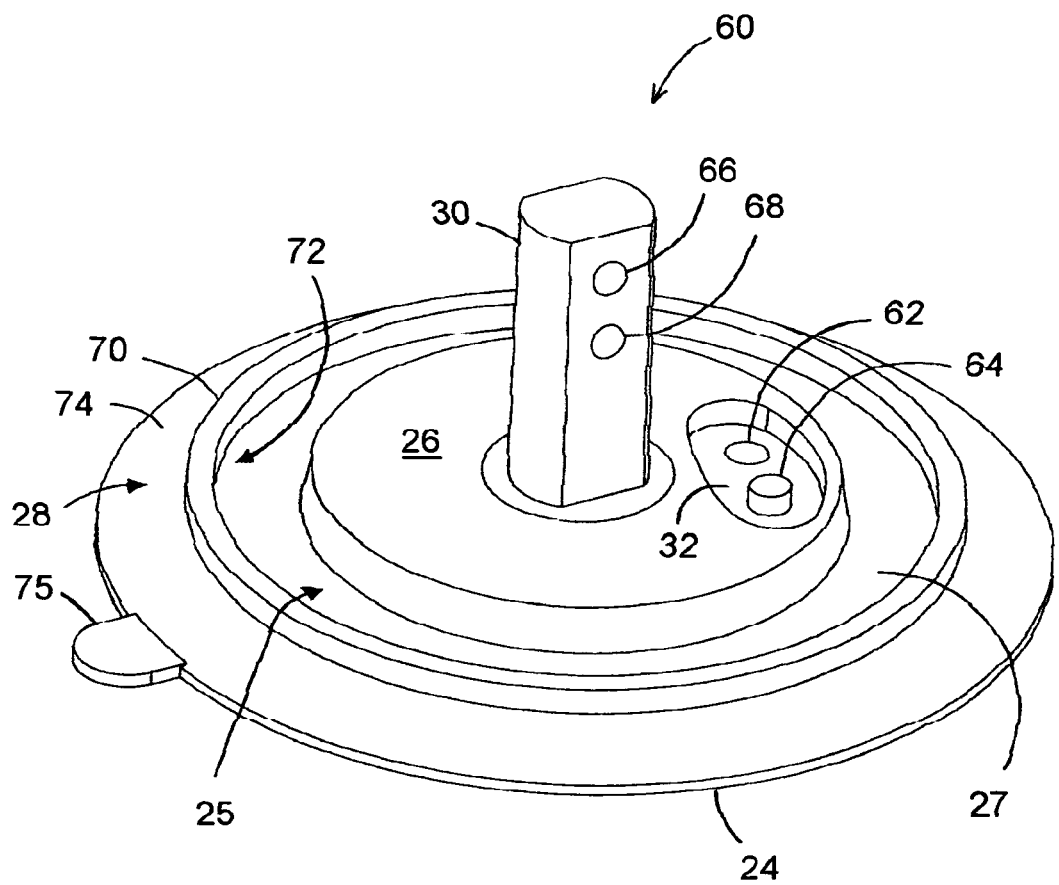
FIG. 3 illustrates the suction cup and drive shaft of the invention of U.S. Pat. No. 6,666,420 embodied in a plunger assembly.
Figure 4:
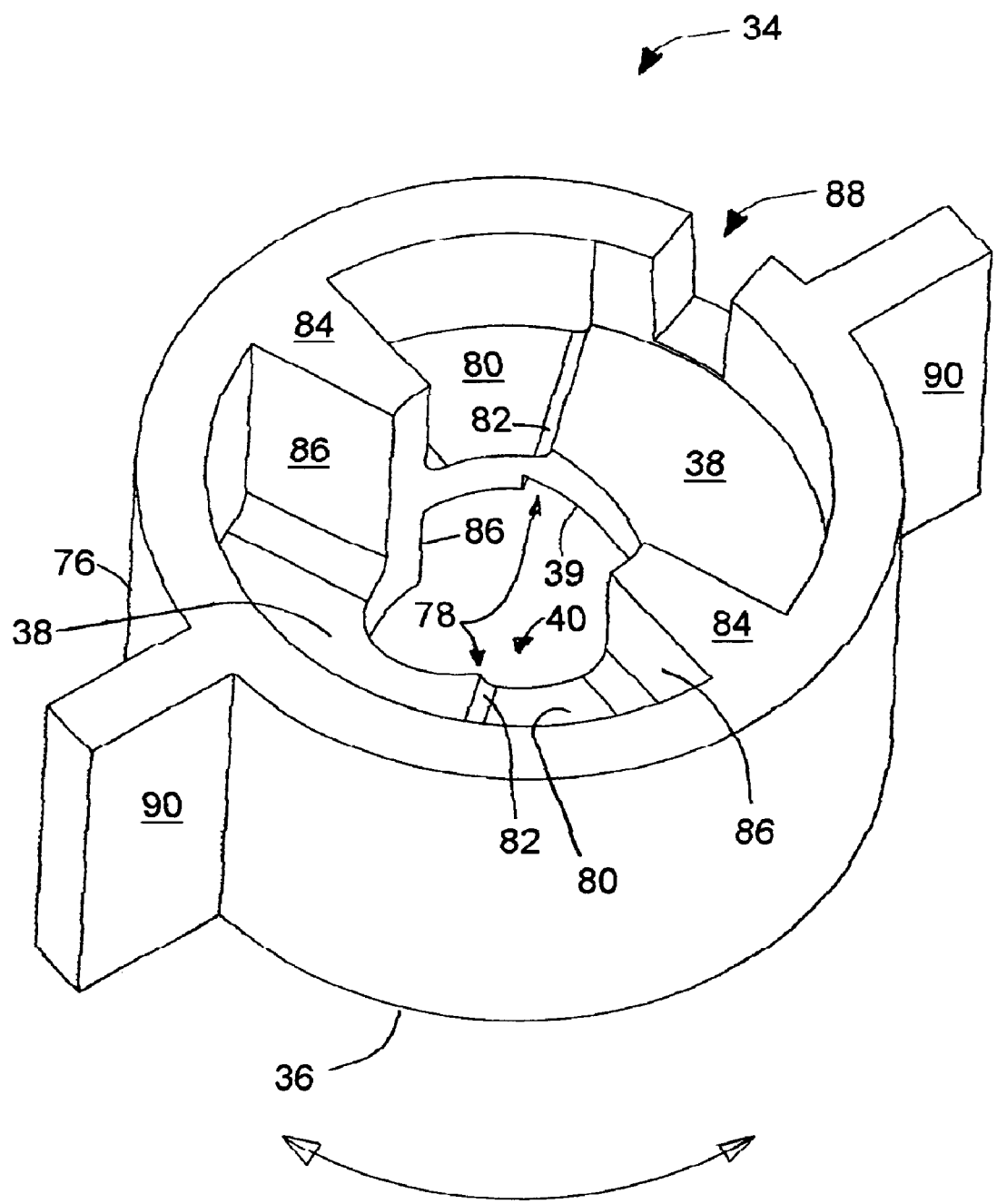
FIG. 4 illustrates one embodiment of the spiral axial drive member of the invention of U.S. Pat. No. 6,666,420 that is mounted on the drive shaft illustrated in FIG. 1.
Figure 5:
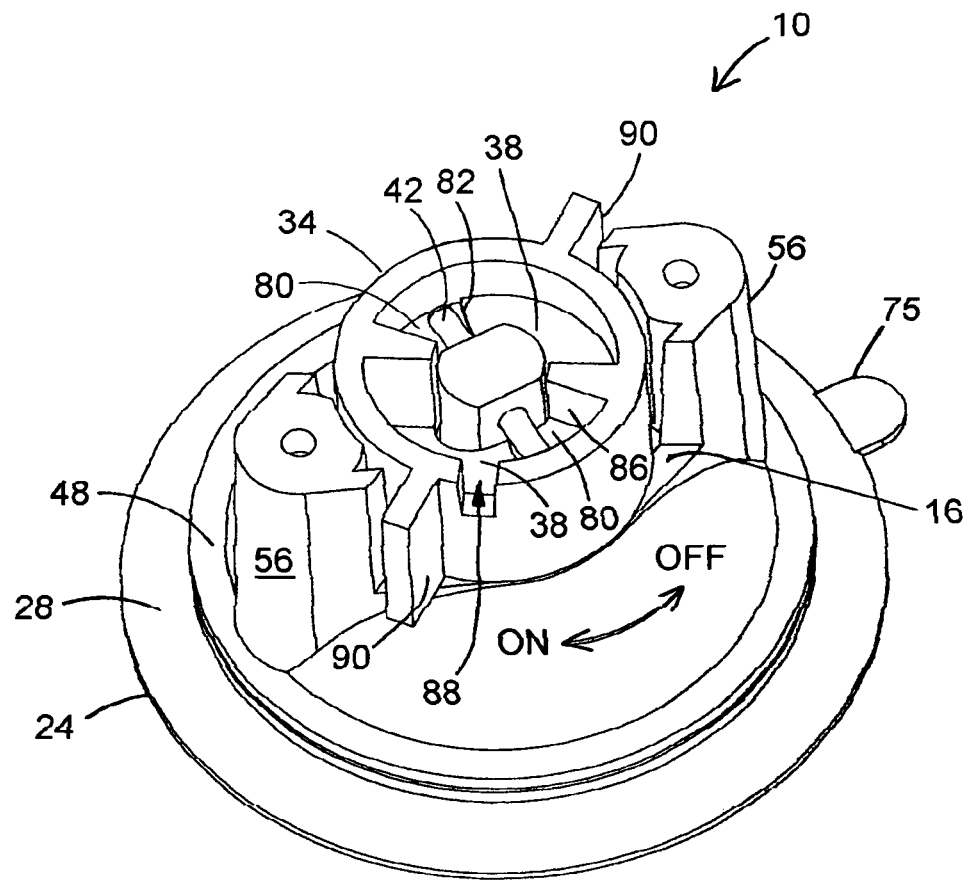
FIG. 5 illustrates the suction cup device of the invention of U.S. Pat. No. 6,666,420 for describing the assembly and operation of the device.
Figure 6:
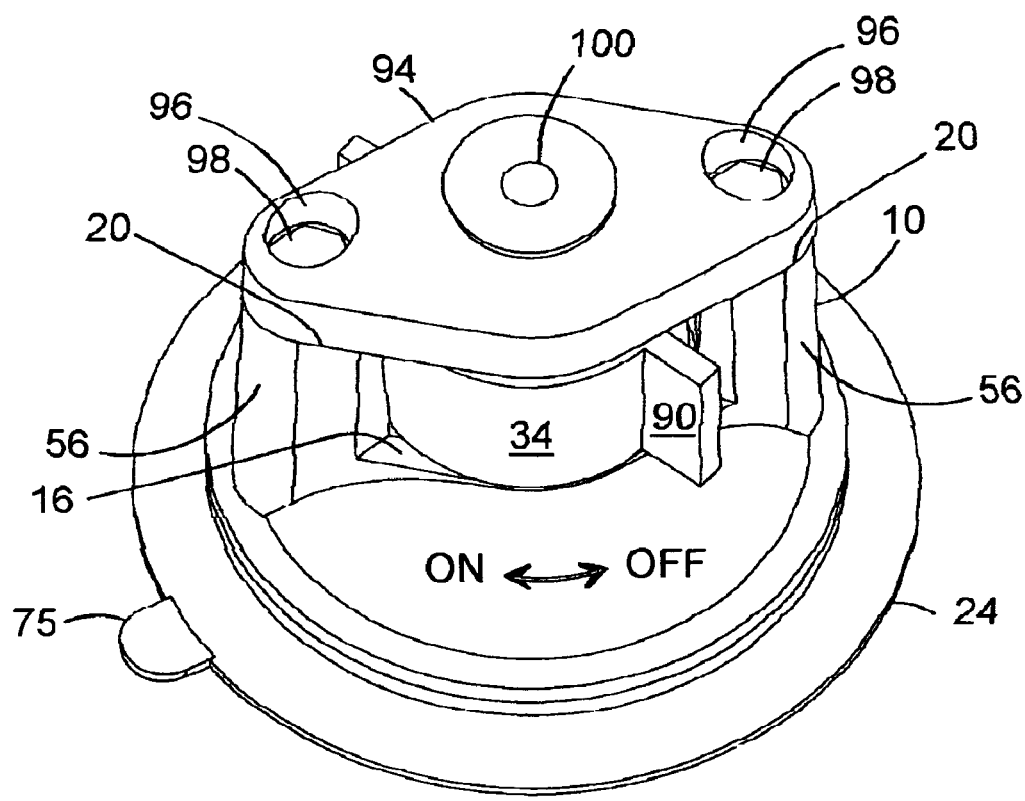
FIG. 6 illustrates the suction cup device of the invention of U.S. Pat. No. 6,666,420 having a device mounting structure installed on a utilization mounting surface thereof.

The suction cup device 200 according to the present invention utilizes the same suction cup housing 12 illustrated in FIG. 2 that is embodied as a shallow "bell" shaped body 44 an under surface of which is formed with the concave cavity 14. As is more clearly shown in FIGS. 1 and 7, the concave cavity 14 is by example and without limitation formed with a shallow semi-spherical shape that is further truncated at its inner surface by the substantially planar underside 46 of the drive surface 16. The concavity 14 is alternatively embodied as a shallow semi-spherical shape that maintains its curvature across the underside 46 of the drive surface 16. According to another alternative embodiment, the concavity 14 is embodied as a shallow "funnel" shape that either maintains its shape to the underside 46 of the reaction drive surface 16, or is truncated at its inner surface by the substantially planar underside 46 of the reaction drive surface 16.

The drive surface 16 is embodied as a substantially planar surface that truncates the semi-spherical exterior of the housing 12 at a position opposite from the concave cavity surface 14 and spaced apart from it by the thickness of the housing body 44. The drive surface 16 is further axially aligned with the concavity 14. The aperture 18 communicating between the reaction drive surface 16 and its underside 46 within the concavity 14 is structured to limit relative rotation of the plunger drive shaft 213 of the suction cup device 200 according to the present invention. For example, the aperture 18 is formed as a generally square or rectangular slot, although other anti-rotational shapes may be used such as oblongs, stars, kidneys and free forms. According to one embodiment, the shape of the aperture 18 follows the generally round overall theme of the axially-driven suction cup device 200 of the present invention having the short sides of the rectangular slot curved or arched substantially concentric with the bell-shaped housing body 44 and the concavity 14 formed therein.

A peripheral lip portion 48 formed concentrically with the bell-shaped housing body 44 is constructed to hold the peripheral lip portion 28 of the suction cup 24 in a smooth, flat annular ring concentric with the housing body 44 and positioned external to the concavity 14. As is more clearly shown in FIGS. 1 and 7, the lip portion 48 includes an annular groove 50 between concentric outward and downward projecting portions 52, 54 for capturing a thick and portion of the suction cup lip 28. The downward projecting portion 54 of the housing lip 48 keeps the suction cup lip 28 from being drawn into the concavity 14 during installation of the suction cup device 200, while the outwardly projecting portion 52 helps to keep the suction cup lip 28 from curling.

The suction cup housing 12 includes the utilization mounting surface 20 formed, for example, as a pair of spaced apart columns 56 diametrically opposed from one another on either side of the drive surface 16 and projecting upwardly from the external surface of the bell-shaped housing body 44. The columns 56 are sized and shaped to provide sufficient stiffness against side loading expected of the application for which suction cup device 200 is intended. The utilization mounting surfaces 20 are substantially co-planar surfaces formed substantially crosswise with the drive surface 16 and disposed on the ends of the columns 56 distal from the housing body 44. Each of the utilization mounting surfaces 20 includes means 22 for attaching thereto. For example, the attaching means 22 are embodied as threaded holes or through holes backed up with embedded or free-floating metal hex nuts or another threaded insert.

Figure 8:
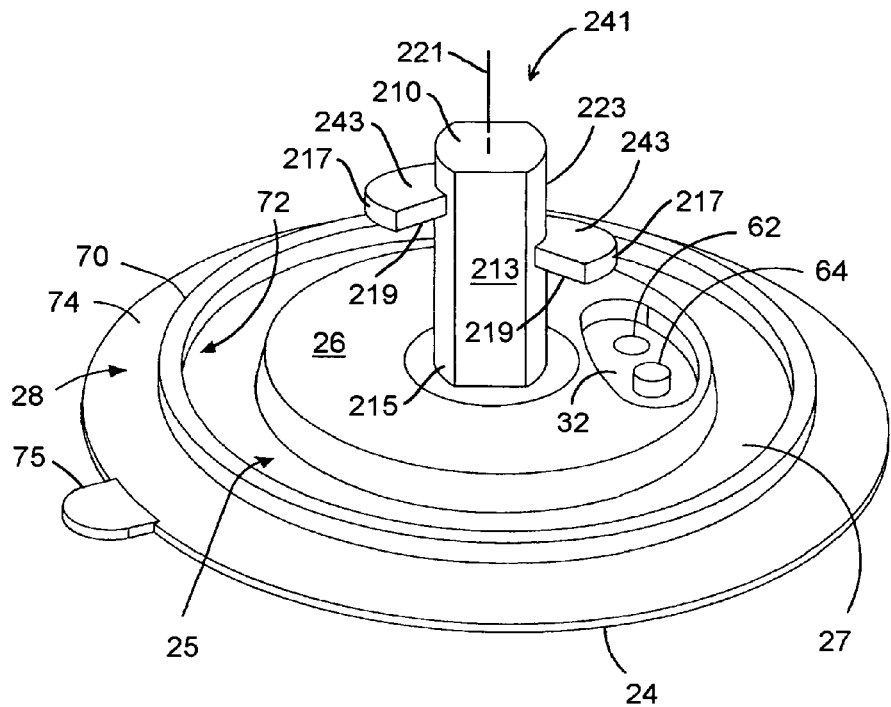
FIG. 8 illustrates a suction cup and axial drive member of the present invention embodied in a plunger assembly of the present invention.

FIG. 8 illustrates the suction cup 24 and the axial drive member 210 embodied in a plunger assembly 241. As is more clearly shown in FIG. 7, the axial drive member 210 includes the plunger drive shaft 213 having the integral disk-shaped foot portion 32 expanding outwardly from the proximate end 215 of the column-shaped body of the plunger drive shaft 213. The circular foot portion 32 is provided with the means 62, 64 for adhering the moldable suction cup material thereto. For example, the adhering means 62, 64 (shown in cutaway) are embodied as a pattern of depressions or holes and short columnar projections, respectively, that may be present individually or in combination (shown). The columnar plunger drive shaft 213 is sized to pass through the aperture 18 in the suction cup housing 12 and is shaped to cooperate with the aperture 18 for maintaining a constant relative rotational orientation, and thus remains rotationally oriented to the suction cup housing 12 during operation. In the example shown, the columnar plunger drive shaft 213 generally rectangular in cross-section and is sized to slidingly engage the aperture 18. When, according to one embodiment illustrated in FIG. 2, the shape of the aperture 18 communicating between the housing drive surface 16 and the concave cavity 14 of the housing 12 has the short sides of the rectangular slot curved or arched substantially concentric with the bell-shaped housing body 44 and the concavity 14 formed therein, then the columnar plunger drive shaft 213 optionally also has the short sides of the generally rectangular body curved or arched substantially concentric with the shape of the aperture 18, as illustrated.

The axial drive member 210 also includes the one, two or more spiral installation drive members 217 each radially extended at least partially about the plunger drive shaft 213. The spiral installation drive members 217 are formed with the respective first inclined axial installation drive surfaces 219 facing toward the foot portion 32 of the plunger drive shaft 213 and the suction cup 24. The axial installation drive surfaces 219 are each relatively inclined at substantially identical angles to the longitudinal axis 221 of the plunger drive shaft 213 and are positioned adjacent to the distal end 223 opposite from the foot portion 32 and spaced away from the suction cup 24.

Optionally, the axial drive member 210 also includes the one, two or more spiral release drive surfaces 243 each radially extended at least partially about the plunger drive shaft 213. By example and without limitation, the spiral release drive surfaces 243 are formed on an opposite side of the spiral installation drive members 217 spaced away from the spiral installation drive surfaces 219 and are substantially similarly inclined at substantially identical angles to the longitudinal axis 221 of the plunger drive shaft 213 and are positioned adjacent to the distal end 223 thereof. Operation of the optional spiral release drive surfaces 243 is described below.

The suction cup 24 is rubber, plastic or another elastically resilient material molded over the circular foot portion 32 of the plunger drive shaft 213, as is more clearly shown in FIG. 7. The adhering means 62, 64 to improve and ensure adhesion of the molded suction cup material to the drive shaft foot portion 32. The deformable suction portion 25 of the suction cup 24 includes a relatively stiff round center section 26 formed of the elastically resilient material over molding the foot 32 of the plunger drive shaft 213. The relatively stiff round center section 26 is surrounded by an integral thin deformably resilient annular portion of that extends to the integral peripheral lip portion 28. According to one embodiment of the present invention, the peripheral lip portion 28 is an annular ring of the elastically resilient material structured to cooperate with the annular groove 50 of the housing body's lip 48 for keeping the peripheral lip 28 from being drawn into the concavity 14 during installation of the suction cup device 200. Accordingly, the lip portion 28 includes the thickened inner peripheral annular ring 70 that forms the annular "shelf" 72 structured to fit within the annular groove 50 between outwardly and downwardly projections 52, 54. The integral peripheral lip 28 may extend outwardly in a thickened annular ring portion 74 having a cross-section of sufficient thickness to avoid curling during installation of the suction cup device 200, thereby effectively increasing the suction cup footprint and the holding power of the suction cup device.

The tab 75 optionally extends from the periphery of the annular ring portion 74 of the suction cup 24. When the suction cup is attached to a surface, manual lifting of the tab 75 by the operator eases release of the suction cup device 200.

Although less effective in operation than a rigid material, the plunger drive shaft 213 is optionally molded of the plastic or other elastically resilient material from which the suction cup 24 is molded. Additionally, when molded of the same material as the suction cup 24, the plunger drive shaft 213 is optionally molded integrally with the suction cup 24, and the foot portion 32 is eliminated.

Figure 9:
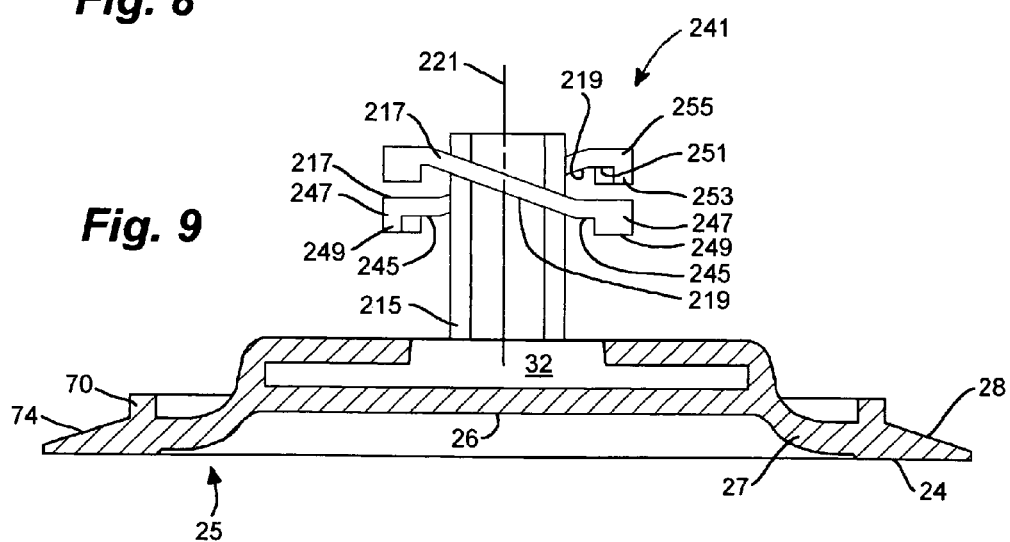
FIG. 9 is a cross-sectional view of the plunger assembly illustrated in FIG. 8 that illustrates one or more spiral installation drive members of the axial drive member of the present invention.

FIG. 9 is a cross-sectional view of the plunger assembly 241 that illustrates one or more of the spiral installation drive members 217 of the axial drive member 210 of the present invention further including anti-rotation "keeper" mechanism 245 for retaining the plunger drive shaft 213 in an "engaged" position. The anti-rotation land or shelf surface 245 is structured to interact with the corresponding installation drive arm 233 of the rotational drive member 225 for securing the plunger drive shaft 213 spaced in a position along the axis 221 with its foot portion 32 pulled away from the drive surface 16 of the housing 12. In the engaged position, the anti-rotation land or shelf surface 245 is structured to interact with the corresponding installation drive arm 233 of the rotational drive member 225 for securing the plunger drive shaft 213 spaced in a position along the axis 221 with its foot portion 32 pulled away from the drive surface 16 of the housing 12.

By example and without limitation, the anti-rotation "keeper" or locking mechanism 245 is provided adjacent to a first end 247 of one or more of the spiral inclined ramp axial installation drive surfaces 219 that is closer to the foot end 215 of the plunger drive shaft 213 and the suction cup 24. By example and without limitation, adjacent to the first end 247 of one or more of the inclined ramp axial installation drive surface 219 extend in the anti-rotation locking mechanism 245 that is structured as a land or shelf surface formed substantially perpendicular to the axis 221 of the plunger drive shaft 213 which corresponds to the installation drive surface 235 on the corresponding radial installation drive arm 233. Alternatively, the anti-rotation land or shelf surface 245 may be canted at a slightly positive inclination relative to the drive shaft axis 221 away from the foot end 215 of the plunger drive shaft 213. A "saddle" is optionally created by a shallow curve or "dish" shaped in shelf to operate as the anti-rotation locking mechanism 245. Irrespective of configuration, the installation drive surface 235 rests on the shelf surface 245. A detent is optionally formed between each installation drive surface 235 and the respective shelf extension 245 as an offset or a steeply negatively inclined plane, as disclosed in the prior art U.S. Pat. No. 6,666,420 which is incorporated herein by reference. Cooperation between the shelf surface of the position locking mechanism 245 and the engaged installation drive surface 235 permits the corresponding radial installation drive arm 233 to stay securely at the closer end 247 of the inclined ramp axial installation drive surface 219 when the rotational drive member 225 is rotated to force the plunger drive shaft 213 along its axis 221 and to pull the center section 26 of the suction cup 24 away from the intended mounting surface, whereby the airtight cavity is formed as shown in FIG. 7.

One or more of the spiral installation drive members 217 also optionally includes a stop 249 adjacent to the first end 247 of the inclined ramp surface 219 which prevents the corresponding installation drive arm 233 from overshooting the engaged position retention surface 245 when the rotational drive member 225 is rotated to engage the suction cup device 200. By example and without limitation, the stop 249 is structured as a tooth extended from the engaged position retention surface 245 opposite from the inclined ramp axial installation drive surface 219. The one or more stops 249 provide stops in the form of solid surfaces for one or more of the installation drive arms 233.

One or more of the spiral installation drive members 217 also optionally includes a second relaxed position retention surface 251 and a corresponding stop 253 adjacent to a second end 255 of the inclined ramp axial installation drive surface 219 further from the foot portion 32 of the plunger drive shaft 213 and the suction cup 24. The relaxed position retention surface 251 is formed as a flat land surface formed substantially perpendicular to the axis 221 of the plunger drive shaft 213, and the corresponding stop 253 is formed as a tooth extended from the relaxed position retention surface 251 opposite from the inclined ramp axial installation drive surface 219.

The relaxed position retention surface 251 permits the corresponding radial installation drive arm 233 to stay securely at the second end 255 of the inclined ramp axial installation drive surface 219 when the rotational drive member 225 is rotated to permit the plunger drive shaft 213 to slide along its axis 221 toward the drive surface 16 of the housing 12, whereby the center section 26 of the suction cup 24 is relaxed, the airtight cavity is reduced, and the suction cup device 200 is disengaged from the mounting surface.

The second stop 253 corresponding to the relaxed position retention surface 251 prevents the corresponding installation drive arm 233 from overshooting the relaxed position retention surface 251 when the rotational drive member 225 is rotated to disengage the suction cup device 200.

Figure 10:
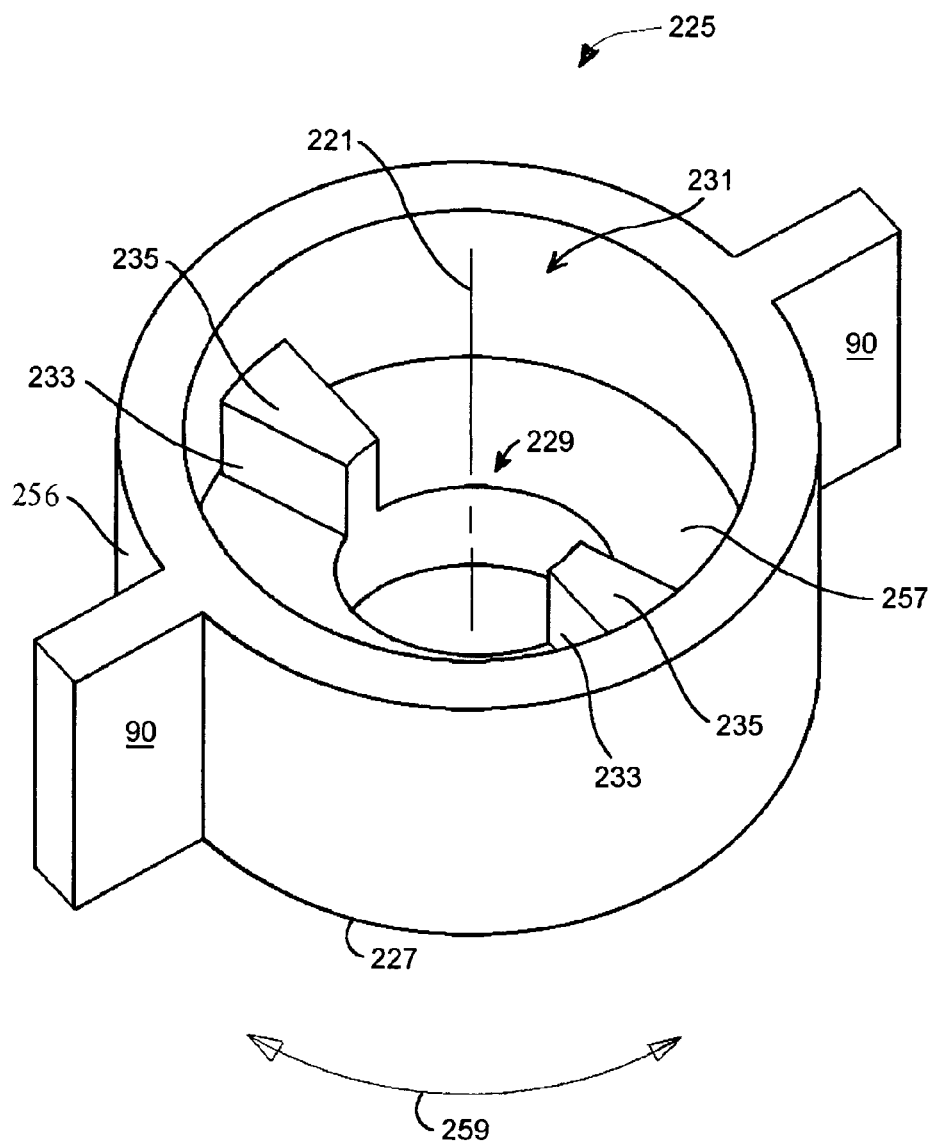
FIG. 10 illustrates one embodiment of the rotational drive member of the present invention that is mounted on the plunger drive shaft and seated on the housing drive surface as illustrated in FIG. 7.

FIG. 10 illustrates one embodiment of the rotational drive member 225 that is mounted on the plunger drive shaft 213 and seated on the housing drive surface 16 as illustrated in FIG. 7. As illustrated here, the rotational drive member 225 includes the substantially planer drive surface 227 embodied as an annular ring formed as one surface of a substantially tubular-walled body or frame 256 that is its main structural component and forms the interior cavity portion 231. In the top-down perspective view of FIG. 7 the pair of installation drive surfaces 235 are shown as a pair of diametrically-opposed surfaces on opposite sides of the round axial aperture 229. The installation drive surfaces 235 are formed on the respective radial installation drive arms 233. The radial installation drive arms 233 raise or offset the installation drive surfaces 235 above an optional base portion 257 of the rotational drive member 225 that forms a floor of the interior cavity 231 so as to provide clearance for the first ends 247 of the inclined ramp axial installation drive surfaces 219 of the spiral installation drive members 217 of the axial drive member 210 when in a "disengaged" state. The base or floor 257 is formed by example and without limitation as an annular ring having at the approximate center thereof the substantially round axial aperture 229 that communicates between the planar drive surface 227 and the interior cavity portion 231 and is aligned with the longitudinal axis 221 of the plunger drive shaft 213. The raised installation drive surfaces 235 press against the inclined ramp axial installation drive surfaces 219 of the spiral installation drive members 217 when the rotational drive member 225 is rotated against the housing drive surface 16 about the plunger drive shaft 213 of the axial drive member 210. In the "disengaged" state, the respective installation drive surfaces 235 engage the inclined ramp axial installation drive surfaces 219 of the respective spiral installation drive members 217 adjacent to the second ends 255 further from the foot portion 32 of the plunger drive shaft 213 and the suction cup 24. Rotation of the rotational drive member 225 in a first "on" direction cause the installation drive surfaces 235 to engage the inclined ramp axial installation drive surfaces 219 of the spiral installation drive members 217 at their respective second ends 255 and press against them while sliding along them toward their respective first ends 247.

The offset of the drive arms 233 is combined with the thickness of the base or floor 257 to cover a vertical distance relative to the tubular walls of the frame 256 that is configured to create a substantial vacuum between the deformable suction portion 25 of the suction cup 24 and a surface to which it is attached when the rotational drive member 225 is rotated against the housing drive surface 16 about the plunger drive shaft 213 of the axial drive member 210.

Additionally, the rotational drive member 225 includes operating means 90 for gripping and manually rotating it about the device common longitudinal axis 221, as indicated by arrow 259, relative to the suction cup housing 12, whereby the installation drive surfaces 235 are rotated relative to the respective rotationally fixed spiral installation drive surfaces 219 and the plunger drive shaft 213 is driven axially relative to the rotational drive member 255. The operating means 90 is embodied for example as a pair of diametrically opposed flanges projecting outwardly from the tubular walls of the frame 256. Alternatively, the operating means 90 is embodied as another conventional manual gripping device or surface such as a knurled or grooved surface.

Figure 11:
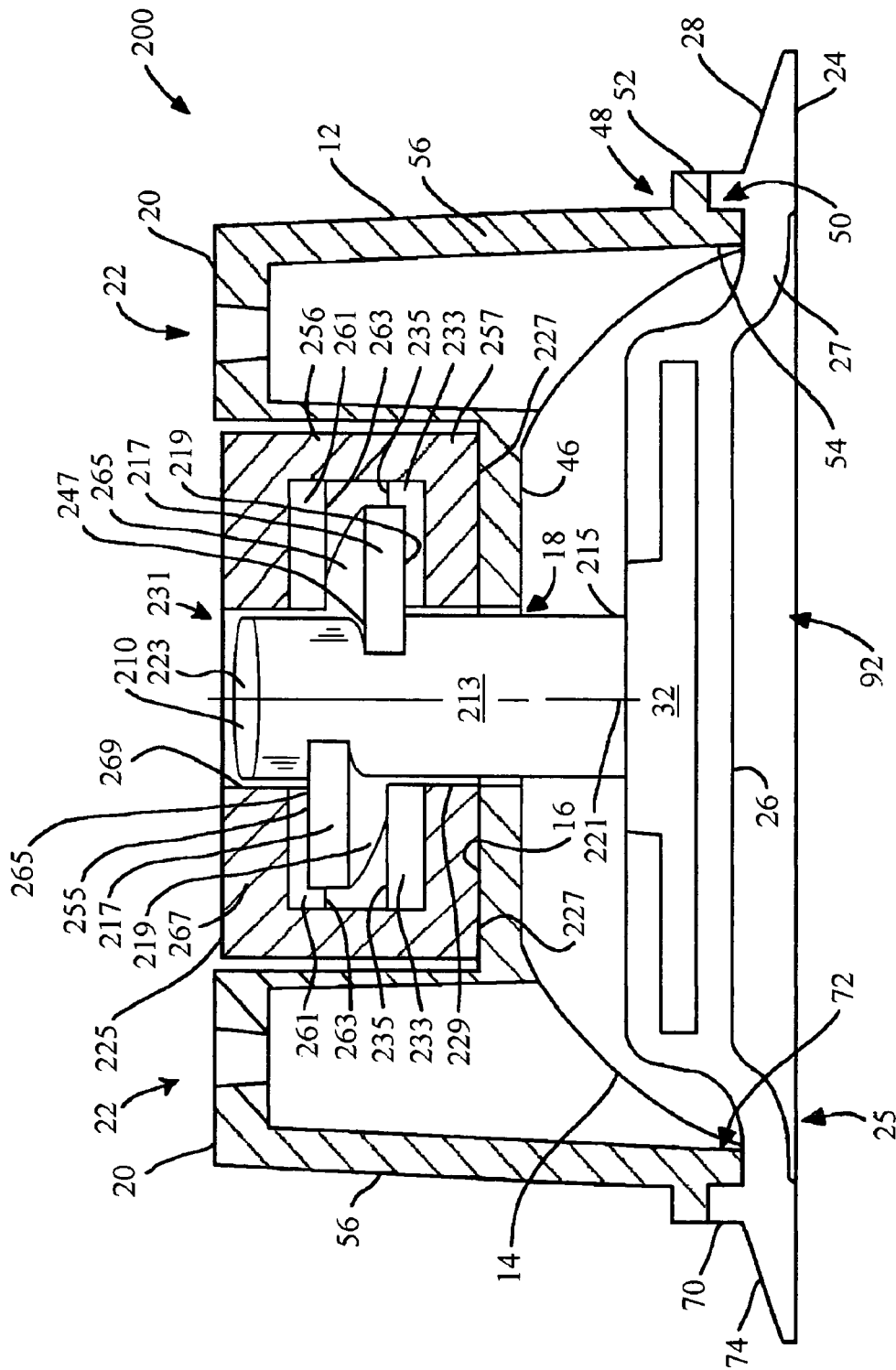
FIG. 11 illustrates the rotational drive member of the present invention having optional release drive arms formed with release drive surfaces on the undersides thereof.

FIG. 11 illustrates the rotational drive member 225 having optional release drive arms 261 having release drive surfaces 263 formed on the undersides thereof. The release drive arms 261 and surfaces 263 cooperate with respective inclined axial release drive surfaces 265 that are formed on the spiral installation drive members 217 opposite from the inclined axial installation drive surfaces 219. The release drive surfaces 263 are relatively inclined at substantially identical angles to a longitudinal axis 221 of the plunger drive shaft 213 similarly to the installation drive surfaces 219. The release drive surfaces 263 cooperate with the inclined axial release drive surfaces 265 to push the plunger drive shaft 213 of the axial drive member 210 an opposite direction along the axis 221 such that the foot portion 32 of the plunger drive shaft 213 is forced away from the interior surface 46 of the cavity 14 and toward the mounting surface, whereby the resilient annular portion 27 of the suction cup 24 is relaxed and the suction cup device 200 is disengaged.

The rotational drive member 225 includes an optional cap portion 267 that forms a roof of the interior cavity 231 so as to provide clearance for the second ends 255 of the inclined ramp axial installation drive surfaces 219 of the spiral installation drive members 217 when the axial drive member 210 is in an "engaged" state. The cap or roof 267 is formed by example and without limitation as an annular ring having at the approximate center thereof a substantially round axial aperture 269 that communicates between the interior cavity portion 231 and an exterior of the drive member 225 and is aligned with the longitudinal axis 221 of the plunger drive shaft 213. Alternatively, the optional cap or roof 267, when present, is spaced far enough from the end surface 223 of the plunger drive shaft 213 as to provide clearance above the end 223, whereby the axial aperture 269 is obviated.

Figure 12:
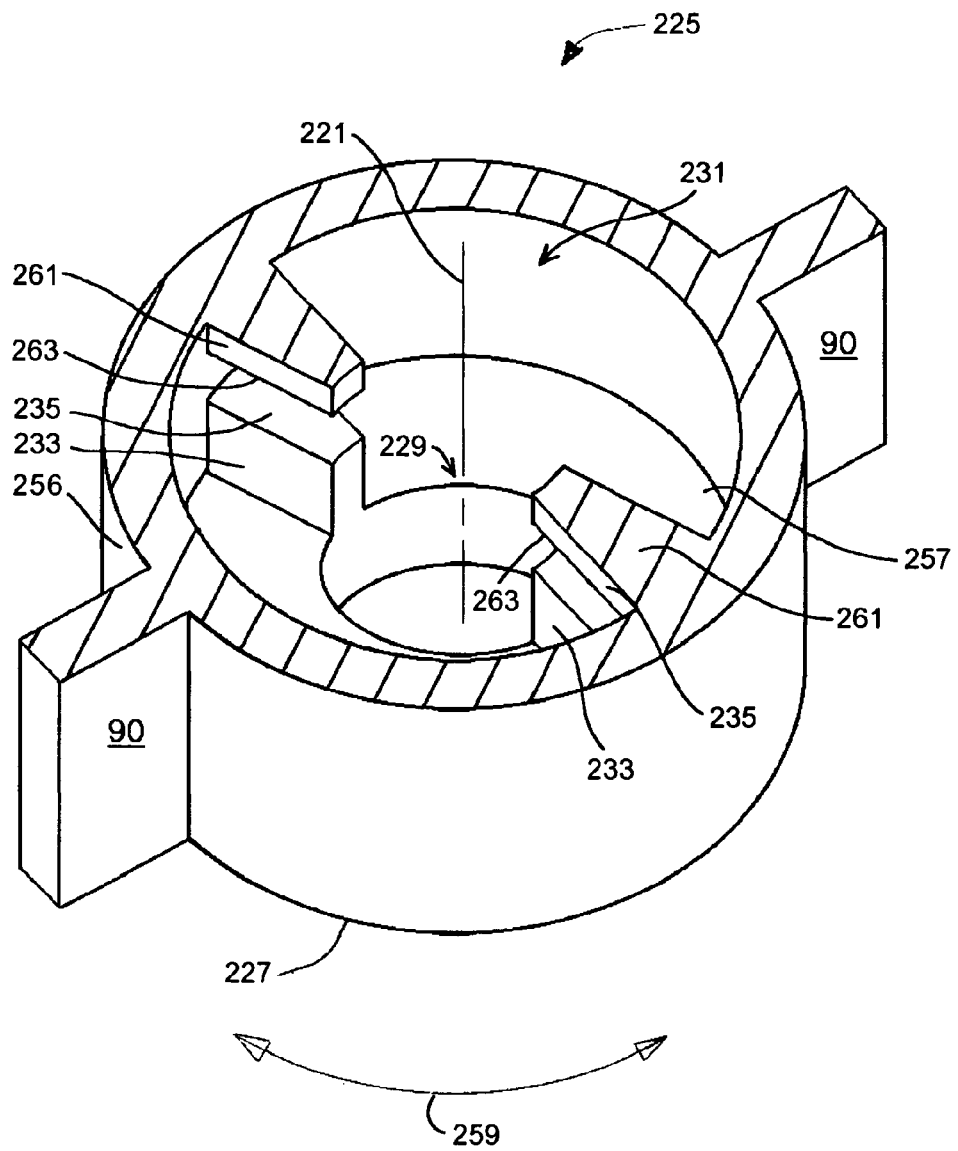
FIG. 12 is a cross-section view of the rotational drive member illustrated n FIG. 11.

FIG. 12 illustrates the rotational drive member 225 having the optional release drive arms 261 with the release drive surfaces 263 formed on the undersides thereof. Here, the view is a cross-section taken through the tubular frame 256 below the optional cap or roof 267 for clarity.

Figure 13:
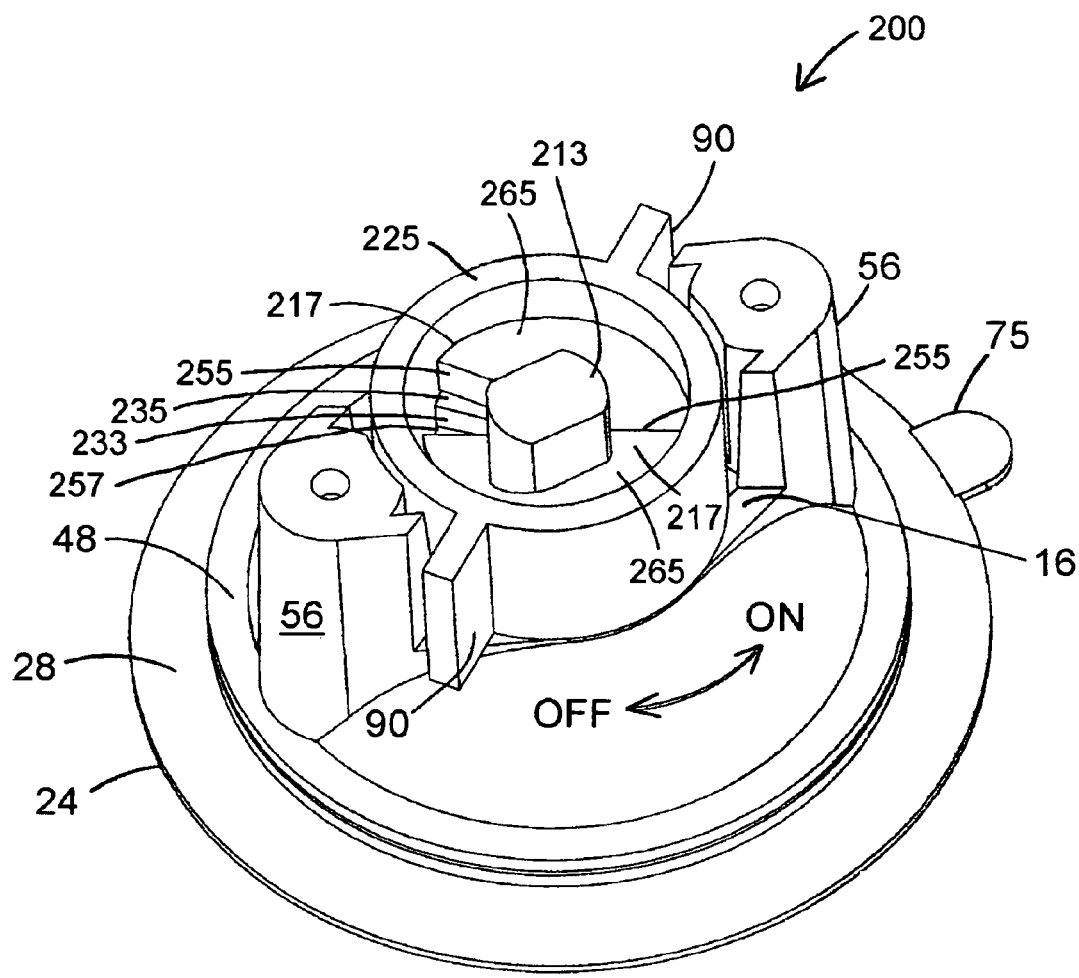
FIG. 13 illustrates the suction cup device of the present invention and is useful in describing the assembly and operation of the suction cup device of the present invention, including its compact axial suction cup installation and release mechanism of the present invention.

FIG. 13 illustrates the suction cup device 200, with the utilization of mounting surface 20 exposed. The illustration is useful in describing the assembly and operation of the suction cup device 200, including its compact axial suction cup installation and release mechanism. As illustrated, the suction cup 24 is installed with the deformable suction portion 25 positioned within the concavity 14 of the housing 12, as more clearly shown in FIG. 7, and the peripheral lip portion 28 extending beyond the portion 48. As is also more clearly shown in FIG. 7, the columnar plunger drive shaft 213 passes through the cooperating axial aperture 18 communicating between the interior surface 46 of the cavity 14 and the planar drive surface 16 of the suction cup housing 12.

The round axial aperture 229 of the rotational drive member 225 is fitted over the end of the columnar plunger drive shaft 213 projecting through the axial aperture 18 above the housing drive surface 16. The optional cap or roof 267 (removed for clarity) fits between the spiral installation drive members 217 and the drive surface 16 of the housing 12. The respective installation drive surface 235 are thereby positioned on opposite sides of the plunger drive shaft 213 with each in proximity to the respective axial installation drive surface 219 projecting crosswise from opposite sides of the plunger drive shaft 213 and adjacent the second end 255 distal from the foot portion 32 of the plunger drive shaft 213 and the suction cup 24. The planar drive surface 227 is positioned adjacent to and in contact with the housing reaction drive surface 16, as is more clearly shown in FIG. 7.

When the suction cup 24 is in a relaxed state, the radial installation drive arms 233 are positioned slightly below the corresponding inclined axial installation drive surface 219 of the axial drive member 210 with the corresponding installation drive surfaces 235 adjacent to the second ends 255 further from the first end 215 of the plunger drive shaft 213 proximate to the suction cup 24. One installation drive surface 235 is therefore partially obscured, and another is completely obscured.

In operation, with the rotational drive member 225 rotated to release pressure between the radial installation drive arms 233 and the corresponding spiral installation drive members 217 of the axial drive member 210, the peripheral lip portion 28 of the relaxed suction cup 24 is placed against a smooth surface to which the suction cup device 200 to be attached. When the operator is satisfied with the position of the suction cup device 200 relative to the attachment surface, a torque load is applied via the flanges 90 to rotate the drive member frame 256 relative to the suction cup housing 12 in the installation direction indicated by the arrow marked "ON." During rotation, the installation drive surface 235 on each of the radial installation drive arms 233 of the rotational drive member 225 comes into contact with a downwardly ramping spiral axial installation drive surfaces 219. Continued application of the torque load to the drive member frame 256 causes the installation drive surface 235 to travel downwardly along the spiral ramp of the corresponding axial installation drive surfaces 219. The planar drive surface 227 forming the bottom surface of the rotational drive member 225 is simultaneously rotated against the housing reaction drive surface 16. As the installation drive surface 235 travels downwardly along the corresponding axial installation drive surfaces 219. The plunger drive shaft 213 is drawn along the common longitudinal axis 221 upwardly through axial aperture 18 in the housing drive surface 16. The foot portion 32 is carried upwardly as part of the plunger drive shaft 213. The center section 26 of the suction cup 24 to his drawn up for delay with the foot portion 32 into the concavity 14 while the peripheral housing lip 48 maintains a manual or shape and position of the suction cup peripheral lip 28 external to the concavity 14. In effect, motion of the installation drive pin 42 upwardly along the installation drive surfaces 235 pulls the plunger drive shaft 213 of the plunger 241 and out of the concavity 14 through the axial aperture 18 in the housing reaction drive surface 16. As the length of the plunger drive shaft 213 increases above the housing drive surface 16, the portion within the concavity 14 shortens. The thin deformably resilient annular portion 27 of the suction cup 24 is forced to stretch between the withdrawing center section 26 positionally fixed peripheral lip 28. An airtight cavity 92 (shown in FIG. 7) is formed beneath the suction cup wherein a partial vacuum is formed relative to ambient atmospheric pressure.

Rotation of the axially-driven rotational drive member 225 ceases when one of the installation drive arms 233 encounters the solid stop 249 adjacent to the first end 247 of the corresponding inclined ramp surface 219, which prevents the installation drive arm 233 from overshooting the end. Other rotational stops may also be provided such as the flanges 90 encountering one of the columns 56 bearing the utilization mounting surfaces 20.

The pressure exerted by the installation drive arms 233 is maintained by the spaced apart position of the ends 247 of the inclined ramp surfaces 219 relative to the housing reaction drive surface 16. This relative position is maintained by the anti-rotation keeper or locking mechanism 245, whereby the extension or step portion 245 are settled on the installation drive arms 233 at maximum elevation relative to the housing drive surface 16. Passing the installation drive surface 235 over the optional detent or saddle at the end of the anti-rotation land or shelf surface 245, as well as the tension generated in the suction cup 24, ensures that the installation drive arms 233 cannot back up the inclined ramp surfaces 219.

The suction cup device 200 is released from the attachment surface by release of the relative vacuum within the suction cup 24. This is accomplished by collapsing the airtight cavity 92 by driving the center 26 of the suction cup 24 downwardly to the attachment surface, whereby tension in the stretched deformably resilient annular portion 27 is released and the suction cup 24 returns to its relaxed condition. The center 26 of the suction cup 24 is relaxed to move downwardly by release of the interaction of the installation drive arms 233 with the corresponding when the torque load is applied to rotate the rotational drive member 225 in a release direction, as indicated by the arrow marked "OFF." For example, a released torque load is applied to the flanges 90 of the drive member frame 256. Lifting or spacing force by the installation drive arms 233 against the spiral installation drive members 217 is released by moving the installation drive surfaces 235 upwardly along the inclined ramp surfaces 219 which combines with the elasticity of the stretched deformably resilient annular portion 27 material to push the plunger drive shaft 213 down through the axial aperture 18 into the concavity 14. When the upward force on the plunger drive shaft 213 is completely removed and the suction cup 24 is relaxed, the relative vacuum holding the suction cup device 200 against the attachment surface is released and the device 200 can be moved.

Alternatively, the optional release drive arms 261, when present, encourage release of the suction cup device 200 from the attachment surface by release of the relative vacuum within the suction cup 24. This is accomplished by the actively driving the center 26 of the suction cup 24 downwardly toward the attachment surface, whereby tension in the stretched deformably resilient annular portion 27 is released and the suction cup 24 returns to its relaxed condition. The center 26 of the suction cup 24 is driven downwardly by interaction of the release drive surfaces 263 formed on the undersides of release drive arms 261 against the corresponding inclined axial release drive surfaces 265 that are formed on the spiral installation drive members 217 opposite from the inclined axial installation drive surfaces 219 when the torque load is applied to rotate the rotational drive member 225 in a release direction, as indicated by the arrow marked "OFF." For example, a released torque load is applied to the flanges 90 of the drive member frame 256. Force by the release drive surfaces 263 moving upwardly along the release drive surfaces 65 combines with the elasticity of the stretched deformably resilient annular portion 27 material to push the plunger drive shaft 213 down through the axial aperture 18 into the concavity 14. When the upward force on the plunger drive shaft 213 is completely removed and the suction cup 24 is relaxed, the relative vacuum holding the suction cup device 200 against the attachment surface is released and the device 200 can be moved.

Figure 14:
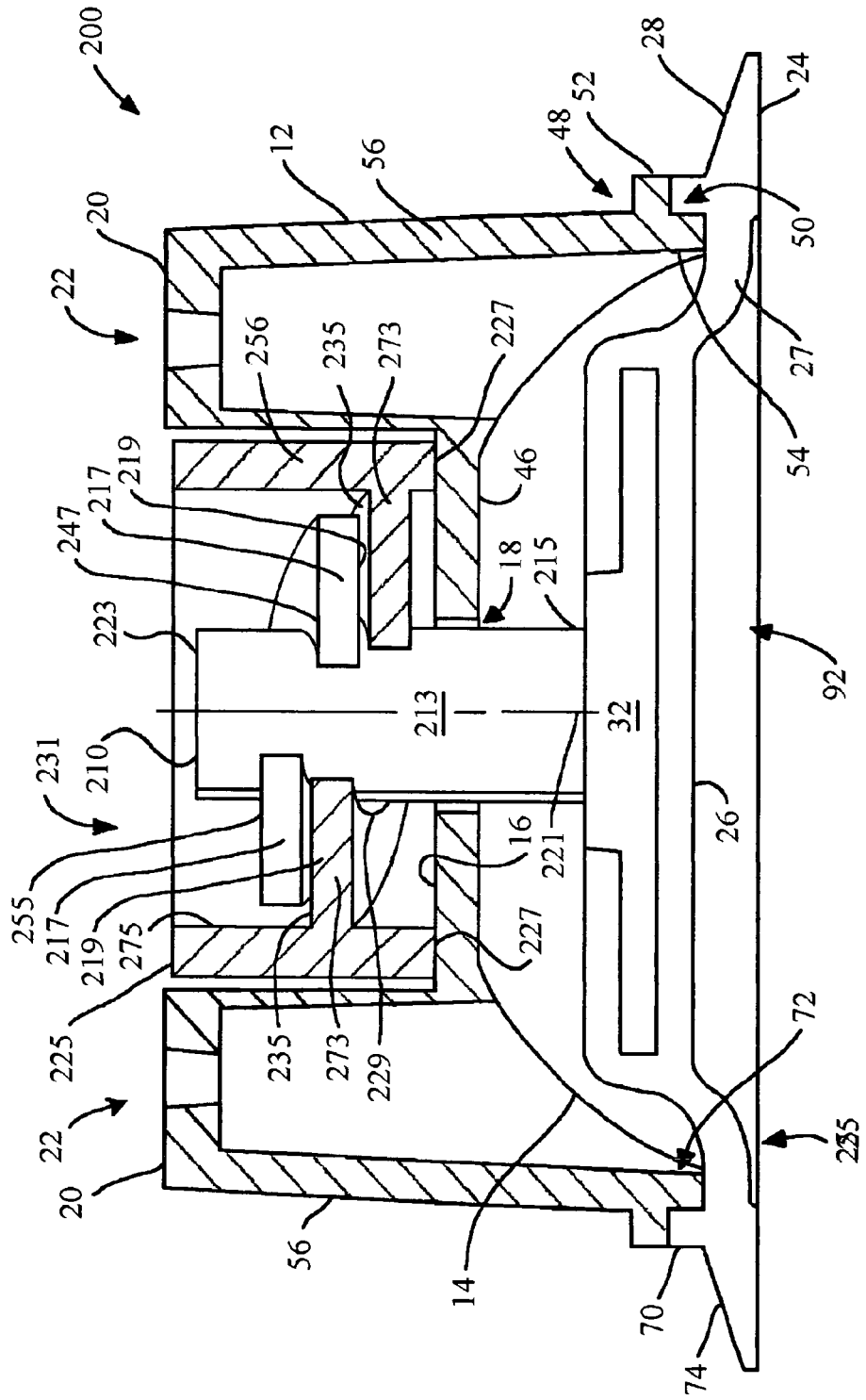
FIG. 14 illustrates another embodiment of the rotational drive member of the present invention wherein the installation drive surfaces of the present invention are formed as upwardly ramping axial installation drive surfaces similar to the upwardly ramping axial installation drive surfaces of the prior art disclosed in U.S. Pat. No. 6,666,420.

FIG. 14 illustrates another embodiment of the rotational drive member 225 wherein the installation drive surfaces 235 are formed as upwardly ramping axial installation drive surfaces similar to the upwardly ramping axial installation drive surfaces 38 of the prior art disclosed in U.S. Pat. No. 6,666,420, which is incorporated herein by reference, and which may be substituted without departing from the spirit and scope of the invention. The upwardly ramping installation drive surfaces 235 are formed on upper surfaces of respective spiral installation drive arms 273 which are extended partially around an interior surface 275 of the tubular walls of the frame 256 that forms the interior cavity portion 231 of the rotational drive member 225. The spiral installation drive arms 273 form the round axial aperture 229 therebetween so that the rotational drive member 225 remains substantially aligned with the longitudinal axis 221 of the plunger drive shaft 213 while its drive surface 227 is rotated relative to the housing drive surface 16. In operation, the upwardly ramping axial installation drive surfaces 235 interact with the corresponding inclined ramp axial installation drive surfaces 219 to drive the respective spiral installation drive members 217 away from the housing drive surface 16, whereby the suction cup device 200 of the present invention is secured to the intended surface, as discussed herein.

The suction cup device 200 is released by rotating the rotational drive member 225 in the opposite "OFF" direction which spins the spiral installation drive arms 273 in a downward spiral toward the housing drive surface 16. The spiral installation drive members 217 are allowed to descend toward the housing drive surface 16 by the inclined ramp axial installation drive surfaces 219 sliding down the respective ramping installation drive surfaces 235 that spiral downward with the spinning spiral installation drive arms 273.

Figure 15:
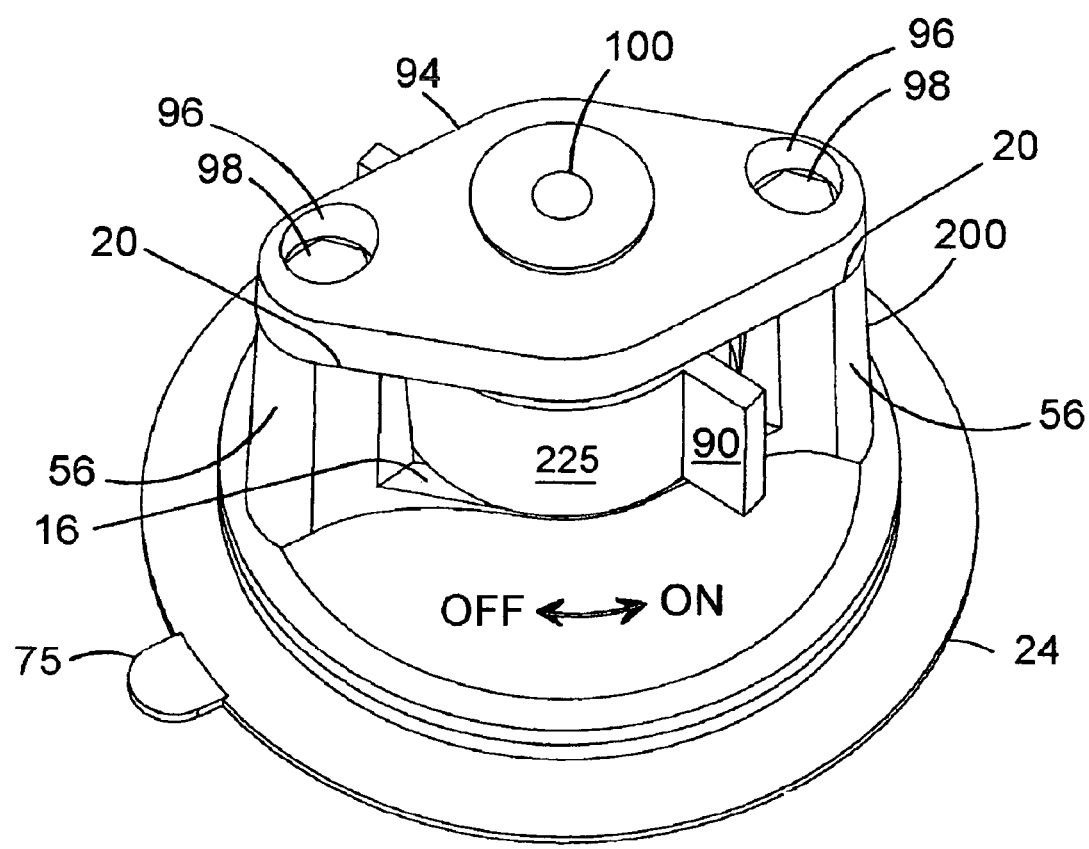
FIG. 15 illustrates the suction cup device of the invention having a device mounting structure installed on utilization mounting surfaces thereof

FIG. 15 illustrates the suction cup device 200 of the invention having a device mounting structure 94 installed on the utilization mounting surfaces 20. The device mounting structure 94 includes means for attaching to the utilization mounting surfaces 20. For example, counter-bores and through holes 96 are provided a for a fastener 98 to be threaded to the nut or insert provided at the mounting holes 22. The device mounting structure 94 includes, by example and without limitation, device mounting means such as a threaded or other capture hole 2000.

The two-hole diamond shape of the device mounting structure 94 illustrated is not intended to be exhaustive and is shown as only one example and without limitation. The device mounting structure 94 is optionally embodied in any useful configuration. For example, the device mounting structure 94 is embodied suitably for mounting the resiliently compressible ball-shaped coupler described in U.S. Pat. No. 5,845,885, entitled UNIVERSALLY POSITIONABLE MOUNTING DEVICE, issued Dec. 8, 1998, to the inventor of the present invention, which is incorporated herein by reference. Alternatively, the device mounting structure 94 is embodied suitably for mounting the wheel-and-axle assembly of the positively-positionable mount described in allowed U.S. Pat. No. 6,561,476 entitled POSITIVELY-POSTIONABLE MOUNTING APPARATUS, issued to the inventor of the present invention, which is incorporated herein by reference.

According to another alternative, the device mounting structure 94 is embodied suitably for mounting either of the male and female mounting bases for use in combination with the carrying apparatus for a mobile electronic device disclosed in allowed U.S. patent application Ser. No. 10/607,938, entitled UNIVERAL MOBILE ELECTRONIC DEVICE HOLDER AND CARRYING CASE, filed Jun. 27, 2003, in the name of the inventor of the present invention, which is incorporated herein by reference. Other alternative embodiments of the device mounting structure 94 are also contemplated for mounting a variety of different useful devices.

While the preferred embodiment of the invention has been illustrated and described, it will be appreciated that various changes can be made therein without departing from the spirit and scope of the invention.

What is claimed is:

1. A compact axially-driven suction cup device, comprising:
   a housing comprising a recess formed in a first surface, a drive surface external to and aligned with the recess, an aperture communicating between the housing drive surface and the recess;
   a suction cup;
   an axial drive member comprising a drive shaft coupled to a central portion of the suction cup and being sized to pass through the aperture in the housing, and a spiral installation drive surface, wherein the spiral installation drive surface of the axial drive member further comprises a pair of substantially diametrically opposed spiral installation drive surfaces each being extended at least partially about the drive shaft; and
   a rotational drive member comprising a cooperating rotational drive surface structured to cooperate with the housing drive surface, an aperture communicating with the cooperating rotational drive surface and being sized to slidingly engage the drive shaft, and a plurality of fixed installation drive surfaces each being fixed crosswise to the drive shaft and being structured to interact with at least one of the spiral installation drive surfaces of the axial drive member.

2. The suction cup device of claim 1 wherein the axial drive member further comprises a spiral release drive surface formed opposite and spaced away from the spiral installation drive surface and inclined substantially similarly thereto; and
   the rotational drive member further comprises a fixed release drive surface fixed crosswise to the drive shaft and being structured to interact with the spiral release drive surface of the axial drive member, the fixed release drive surface being spaced away from the fixed installation drive surface by at least the spiral installation and release drive surfaces of the axial drive member.

3. The suction cup device of claim 1 wherein the spiral installation drive surface of the rotational drive member further comprises a retention surface structured to interact with the fixed installation drive surface for maintaining a spaced away position of the axial drive member relative to the drive surface of the housing.

4. The suction cup device of claim 1 wherein the fixed installation drive surface further comprises a spiral drive surface fixed crosswise to the drive shaft and being inclined similarly to an inclination of the spiral installation drive surface of the axial drive member.

5. A compact axially-driven suction cup device, comprising:
   a housing comprising a substantially planar external drive surface formed with an aperture therethrough; and
   a substantially rigid rotational drive member comprising a tubular frame forming a substantially planar drive surface at one end thereof structured to cooperate with the housing drive surface, a pair of fixed installation drive members spaced around an internal wall surface of the tubular frame and projecting substantially axially inwardly therefrom, an aperture into the tubular frame and axially aligned with the internal wall surface and fixed installation drive members thereof, and means for manually rotating the tubular frame;
   an axial drive member comprising a columnar drive shaft structured to travel through the apertures of the rotational drive mechanism and housing, a first end of the columnar drive shaft including means for connecting to a suction cup, and including a pair of substantially diametrically opposed spiral installation drive members each being extended at least partially about the drive shaft and spaced there along away from the first end thereof and being structured for interacting with one or both of the fixed installation drive members of the rotational drive member for moving the columnar drive shaft through the longitudinal aperture of the rotational drive member in an outwardly direction relative to the planar drive surface thereof.

6. The suction cup installation mechanism of claim 5 wherein the rotational drive mechanism further comprises an annular ring positioned within the internal wall surface of the tubular frame adjacent to the planar drive surface at one end thereof with the pair of fixed installation drive members spaced inwardly of the tubular frame therefrom, and having at the approximate center thereof the aperture into the tubular frame.

7. The suction cup installation mechanism of claim 5 wherein the means for connecting to a suction cup further comprises a structure adapted for being molded into the suction cup.

8. The suction cup installation mechanism of claim 5, further comprising a suction cup having a central attachment portion, the central attachment portion coupled to the suction cup connecting means of the columnar drive shaft.

9. The suction cup installation mechanism of claim 5 wherein the housing further comprises a concavity positioned on a surface of the housing opposite from the external drive surface thereof and structured to admit a central flexible portion of a suction cup, the aperture communicating between the external drive surface and the concavity.

10. The suction cup installation mechanism of claim 5 wherein each of the pair of spiral installation drive members of the axial drive member further comprises an installation drive surface facing toward the first end of the columnar drive shaft having the means for connecting to a suction cup, and one or both of the pair of spiral installation drive members further comprises a release drive surface facing opposite from the installation drive surface; and
   the rotational drive mechanism further comprises one or more fixed release drive members projecting inwardly from the internal wall surface of the tubular frame and being structured for interacting with a corresponding release drive surface of the axial drive member for moving the columnar drive shaft through the longitudinal aperture of the rotational drive mechanism in a second direction relative to the planar drive surface thereof opposite from the first direction.

11. The suction cup installation mechanism of claim 10 wherein the one or more fixed release drive members further comprises a pair of fixed release drive members spaced around the internal wall surface of the tubular frame and projecting inwardly therefrom and being spaced inwardly of the tubular frame from the planar drive surface and the pair of fixed installation drive members.

12. The suction cup installation mechanism of claim 5 wherein the housing further comprises a utilization mounting surface structured as a pattern of mounting holes spaced away from the housing planar drive surface a distance sufficient to admit the rotational drive mechanism therebetween.

13. A suction cup holding device having a compact axial installation mechanism, the device comprising:
   a housing comprising a relatively wide and shallow concavity formed therein and forming a first opening on the surface thereof, an external reaction drive surface axially aligned with the concavity, and a second opening communicating between the concavity and the external reaction drive surface;
   a plunger comprising a drive shaft coupled at one end to a suction cup having a resiliently deformable portion sized to cooperate with the housing concavity and an integral peripheral lip portion sized larger than the first opening, the resiliently deformable portion of the suction cup being installed substantially within the housing concavity with the peripheral lip portion projecting beyond the first opening thereof, and the plunger drive shaft being engaged with the second opening between the concavity and the reaction drive surface with a distal portion of the plunger drive shaft projecting external to the concavity and beyond the reaction drive surface, and a pair of substantially diametrically opposed spiral installation drive surfaces each being extended at least partially about the plunger drive shaft; and
   a rotational drive member comprising a rotational drive surface structured to cooperate with the housing reaction drive surface and forming a substantially round central passage therethrough sized to slidingly admit the plunger drive shaft and rotate relative thereto, and two or more fixed installation drive surfaces each being fixed crosswise to the plunger drive shaft and spaced substantially uniformly about an interior of the rotational drive member and spaced away from the rotational drive surface, each of the fixed installation drive surfaces being structured to interact with at least one of the pair of spiral installation drive surfaces of the plunger drive shaft.

14. The suction cup of claim 13 wherein the first opening in the housing formed by the concavity further includes means for engaging the peripheral portion of the suction cup and position only fixing it during operation of the rotational drive member.

15. The suction cup of claim 13, further comprising means for retaining the plunger drive shaft in fixed rotational orientation relative to the housing during operation of the rotational drive member.

16. The suction cup of claim 13 wherein the rotational drive member further comprises means for securing the plunger drive shaft in fixed rotational orientation to the annular installation drive surface.

17. The suction cup of claim 13 wherein the two or more fixed installation drive surfaces of the rotational drive member further comprise part annular fixed installation drive surfaces inclined relative to the rotational drive surface similarly to the part annular installation drive surfaces projected from the plunger drive shaft.

* * * * *